(12) United States Patent
Creel et al.

(10) Patent No.: US 11,650,906 B2
(45) Date of Patent: *May 16, 2023

(54) AUTOMATICALLY VALIDATING DATA INCORPORATED INTO A COMPUTER PROGRAM

(71) Applicant: Cotiviti, Inc., Atlanta, GA (US)

(72) Inventors: Christopher Taylor Creel, Atlanta, GA (US); Mykel Alvis, Birmingham, AL (US)

(73) Assignee: Cotiviti, Inc., Atlanta, GA (US)

( * ) Notice: Subject to any disclaimer, the term of this patent is extended or adjusted under 35 U.S.C. 154(b) by 226 days.

This patent is subject to a terminal disclaimer.

(21) Appl. No.: 17/605,569

(22) PCT Filed: Sep. 26, 2019

(86) PCT No.: PCT/US2019/053112
§ 371 (c)(1),
(2) Date: Oct. 21, 2021

(87) PCT Pub. No.: WO2020/069096
PCT Pub. Date: Apr. 2, 2020

(65) Prior Publication Data
US 2022/0206928 A1    Jun. 30, 2022

Related U.S. Application Data

(63) Continuation of application No. 16/145,468, filed on Sep. 28, 2018, now Pat. No. 10,754,755.

(51) Int. Cl.
*G06F 11/36* (2006.01)
*G06F 16/23* (2019.01)

(52) U.S. Cl.
CPC ...... *G06F 11/3624* (2013.01); *G06F 11/3612* (2013.01); *G06F 11/3616* (2013.01);
(Continued)

(58) Field of Classification Search
None
See application file for complete search history.

(56) References Cited

U.S. PATENT DOCUMENTS

| 5,111,390 A | 5/1992 | Ketcham |
| 6,279,151 B1 | 8/2001 | Breslau |

(Continued)

FOREIGN PATENT DOCUMENTS

| JP | 2003-256202 A | 9/2003 |
| JP | 2013-077188 A | 4/2013 |

(Continued)

OTHER PUBLICATIONS

Abate et al., "When Good Components Go Bad: Formally Secure Compilation Despite Dynamic Compromise," Feb. 2, 2018, updated Sep. 17, 2018, arXiv:1802.00588v4, last retrieved from https://arxiv.org/abs/1802.00588 on Dec. 9, 2022. (Year: 2018).*

(Continued)

*Primary Examiner* — Andrew M. Lyons
(74) *Attorney, Agent, or Firm* — Perkins Coie LLP

(57) ABSTRACT

Embodiments disclosed herein relate to methods, systems, and computer programs for verifying that data incorporated into a computer program is current. The methods, systems, and computer programs compare a source identifier status code associated with the data to a current source identifier status code at the location where the data was obtained. The methods, systems, and computer programs include at least one validation function which determines the validity of the data according to selected parameters. If the source identifier status code and current source identifier status code match and the at least one validation function determines the data is valid, an executable computer program incorporating the data and one or more functions is produced as output.

17 Claims, 8 Drawing Sheets

(52) U.S. Cl.
CPC ...... *G06F 11/3636* (2013.01); *G06F 11/3644* (2013.01); *G06F 16/2365* (2019.01)

(56) References Cited

U.S. PATENT DOCUMENTS

| | | | |
|---|---|---|---|
| 6,901,403 | B1 | 5/2005 | Bata et al. |
| 7,069,543 | B2 | 6/2006 | Boucher |
| 7,089,491 | B2 | 8/2006 | Feinbera et al. |
| 7,318,162 | B2 | 1/2008 | Rineer |
| 7,577,946 | B2 | 8/2009 | Murakami et al. |
| 7,904,877 | B2 | 3/2011 | Multerer et al. |
| 2003/0167423 | A1 | 9/2003 | Murakami et al. |
| 2004/0093198 | A1 | 5/2004 | Neifert |
| 2004/0123101 | A1 | 6/2004 | Rineer |
| 2004/0133883 | A1 | 7/2004 | Sato |
| 2005/0071633 | A1* | 3/2005 | Rothstein ............... G06F 21/51 713/167 |
| 2006/0036422 | A1 | 2/2006 | Gryba |
| 2006/0153017 | A1 | 7/2006 | Kim |
| 2010/0333079 | A1 | 12/2010 | Sverdlov |
| 2011/0276805 | A1 | 11/2011 | Nagpal |
| 2014/0053135 | A1 | 2/2014 | Bird et al. |
| 2015/0317136 | A1 | 11/2015 | Mun |

FOREIGN PATENT DOCUMENTS

| | | |
|---|---|---|
| JP | 2015-526820 A | 9/2015 |
| JP | 2017-016444 A | 1/2017 |

OTHER PUBLICATIONS

P. Brada, "Enhanced OSGi Bundle Updates to Prevent Runtime Exceptions," 2008 34th Euromicro Conference Software Engineering and Advanced Applications, 2008, pp. 92-99, doi: 10.1109/SEAA.2008.51. (Year: 2008).*
International Search Report and Written Opinion from International Application No. PCT/US2019/053112 dated Dec. 6, 2019, pp. 1-17.
Rohit, "Convert CSV Data to Avro Data", Ozone, URL:https://dzone.com/articles/convert-csv-data-avro-data (entire document), Nov. 18, 2019, pp. 1-5.
Sridhar, "How to convert CSV to JSON in Java", Ozone, URL:https://dzone.com/articles/how-to-convert-csv-to-json-in-java (entire document), Nov. 18, 2019, pp. 1-6.
Hu et al., "Duet: Library Integrity Verification for Android Applications," ACM, 2014, 12pg. (Year: 2014)(Abstract only) pp. 1-2.
European Application No. 19866689.3 Search Report dated May 25, 2022.

* cited by examiner

AUTOMATICALLY VALIDATING DATA INCORPORATED INTO A COMPUTER PROGRAM

CROSS-REFERENCE TO RELATED APPLICATIONS

This patent document is a national phase application of and claims priority to International Application No. PCT/US2019/053112, titled "AUTOMATICALLY VALIDATING DATA INCORPORATED INTO A COMPUTER PROGRAM", filed Sep. 26, 2019, which claims priority to U.S. patent application Ser. No. 16/145,468 filed on 28 Sep. 2018, the disclosure of which is incorporated herein, in its entirety, by this reference.

BACKGROUND

Data may be referenced by computer programs. Data may be used or incorporated in any number of formats. Data is typically incorporated into an executable program via a file extension reference or incorporation of a data library into the program.

The data is typically checked to see if it is current and valid by a human who may visually or algorithmically verify that the data is up to date and valid.

The data can be queried by one or more functions to provide answers or determinations. If the data is valid, the answer or determination can be trusted. There can be a large burden in of time and expense to determine if data used in an executable program is valid.

Data acquired from a third party website can change without notice. Changing data could invalidate computer programs relying on it. There can be a large burden of time and expense to determine if data used in an executable program is current.

SUMMARY

Embodiments disclosed herein relate to methods, systems, and computer program products for automatically ensuring the data incorporated into the computer code is current and valid. In an embodiment, a method of validating data incorporated into a computer program is disclosed. The method includes building one or more functions incorporating data obtained from at least one remote location into a source code of the computer program. The method includes incorporating a source identifier status code from the at least one remote location into the one or more functions, the source identifier status code corresponding to a date and a location at which the data was obtained from the at least one remote location. The method includes writing a checksum query into the source code that queries the at least one remote location to determine if the source identifier status code matches a current source identifier status code at the at least one remote location. The method includes providing at least one validation function in the source code, the at least one validation function being configured to perform one or more tests on the data to ensure the data is valid. The method includes adding a build-break function into the source code, the build-break function providing that a computer program build continues only if the source identifier status code and the current source identifier status code match and the at least one validation function confirms that the data is valid. The method includes running a build tool to perform a computer program build effective to compile the source code into an executable computer program that uses the data obtained from the at least one remote location to perform the one or more functions.

In an embodiment, a method of building a computer program using data incorporated therein is disclosed. The method includes directly importing data from at least one remote location into a source code. The method includes incorporating a source identifier status code from the at least one remote location into the source code, the source identifier status code corresponding to a date and a location at which the data was obtained from the at least one remote location. The method includes writing a checksum query into the source code that queries the at least one remote location to determine if the source identifier status code matches a current source identifier status code at the at least one remote location. The method includes providing at least one validation function in the source code, the at least one validation function being configured to perform one or more tests on the data to ensure the data is valid. The method includes adding a build-break function into the source code, the build-break function providing that a computer program build continues only if the source identifier status code and the current source identifier status code match and the at least one validation function confirms that the data is valid. The method includes running a build tool to perform a computer program build effective to compile the source code into an executable computer program that uses the data obtained from the at least one remote location. The method includes running a transformation function on the executable computer program in a second build tool to transform the executable computer program from a first format to a second format, wherein the second build tool executes the at least one validation function and build break function on the data that has been transformed to ensure the data that has been transformed is valid.

In an embodiment, a computer program product is disclosed. The computer program product includes a source code. The source code includes one or more functions incorporating data obtained from at least one remote location. The source code includes a source identifier status code from the at least one remote location in the one or more functions, the source identifier status code corresponding to a date and a location at which the data was obtained from the at least one remote location. The source code includes a checksum query in the source code that queries the at least one remote location to determine if the source identifier status code matches a current source identifier status code at the at least one remote location. The source code includes at least one validation function configured to perform one or more tests on the data to ensure the data is valid. The source code includes a build-break function providing that a computer program build continues only if the source identifier status code and the current source identifier status code match and the at least one validation function confirms the data is valid.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1A:
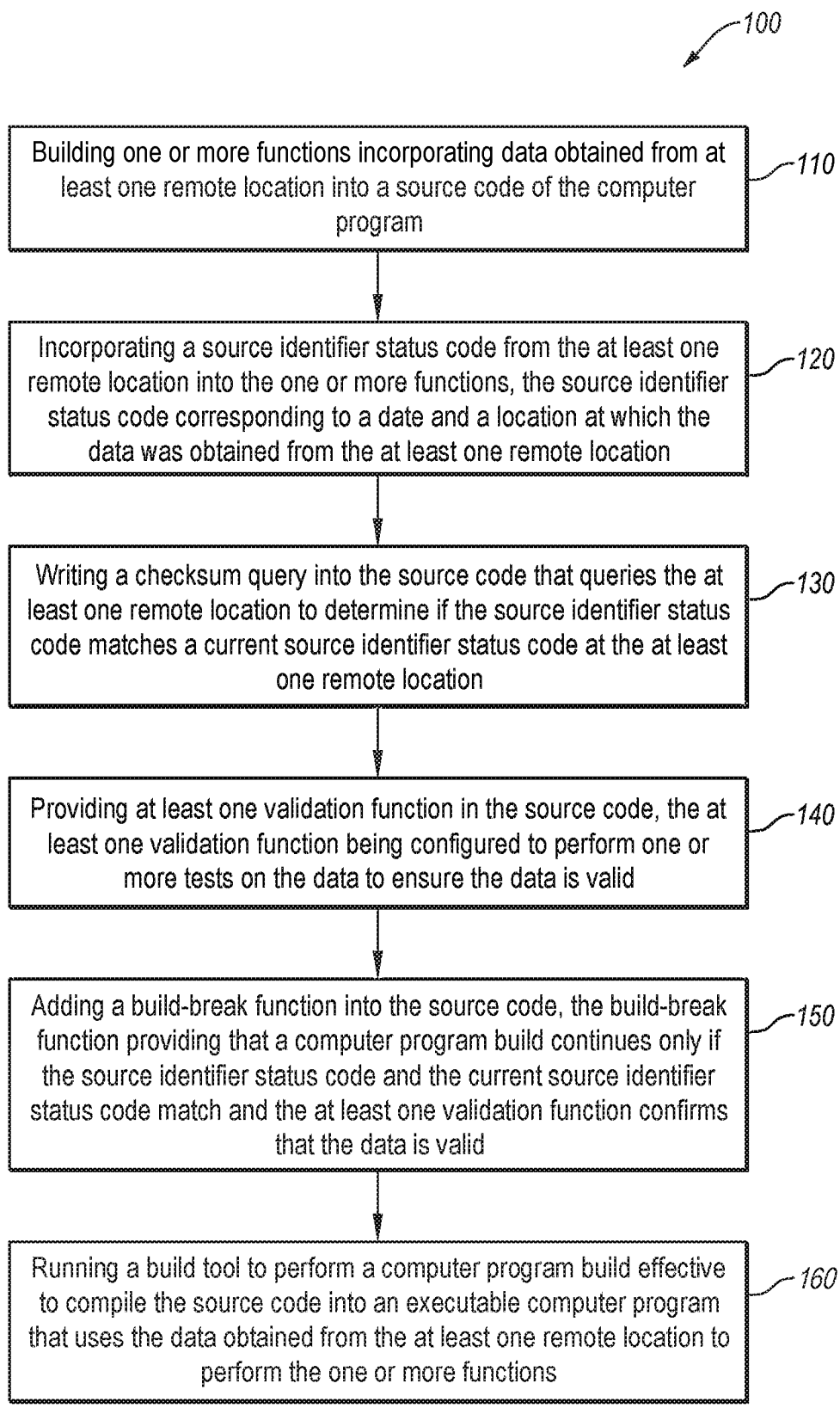
FIG. 1A is a flow chart of a method of validating data incorporated into a computer program, according to an embodiment.

Embodiments disclosed herein relate to methods, computer program products, and systems for automatically verifying the currentness and validity of data incorporated into functions of a computer program. The computer program includes source code which is composed to provide an executable computer program, or a portion thereof, upon executing a build tool on the source code.

Data used for performing functions in computer programs may be included in the source code of the computer program as an archive or library. The data may be stored with the functions as individual artifacts capable of performing the functions using the data. The data may be obtained from remote locations, such as databases available on the Internet. Accordingly, the data may be correlated to a source identifier status code such as a hash calculated from one or more of the date, location, content, or version of the remote location (e.g., webpage version) from which the data is obtained. The source identifier status code is incorporated into the computer program, such as in the functions where the corresponding data is located or in the archive of the data in the program.

The computer program includes a checksum query to verify the source identifier status code (e.g., hash) has not changed since the computer program was built. The checksum query compares the source identifier status code (e.g., checksum or hash) with a current source identifier status code at the location from which the data was obtained. The checksum query is run in a build process carried out by a build tool.

The computer program includes at least one validation function to validate that the data is in a selected format and/or has a value(s) that satisfy one or more test functions (e.g., provide results within a selected range). The at least one validation function compares one or more values or formats of the data with one or more selected or expected value ranges or formats. If the data is in the selected format and value range, the data is confirmed as valid. The at least one validation function is run in the build process carried out by the build tool.

The source includes at least one build-break function that causes a build to break if the checksum query indicates the source identifier status code differs from the current source identifier status code and/or the at least one validation function confirms that the data is not valid. Accordingly, an executable computer program (e.g., application) is only built using the computer program if the source identifier status code in the program matches the current source identifier status code at the source of the data and the data is valid according to the at least one validation function. By including the source identifier status code, the checksum query, and the at least one validation function, the data incorporated into the executable computer program is automatically verified as up to date and valid at build time. The build is then released as an executable computer program or a portion thereof into a file repository in verified archive format, such as in a JAR file. The executable computer program includes the executable code (e.g., software instructions) for performing the one or more functions on the data. Accordingly, the executable computer programs or archives may include the executable code containing the one or more functions and data, the source identifier status code, the checksum query, the at least one validation function, standards against which the at least one validation function is checked, and any other information associated with the source code, each as an individual artifact in the archive. Thus, each executable computer program can be thought of as a verified archive (verified archive file) for building larger executable computer programs which perform the one or more functions on the data in the respective executable computer programs.

The repository may store a plurality of executable computer programs in respective verified archive files, each of which contain respective data and associated one or more functions that use the data, the source identifier status code, the checksum query, the at least one validation function, and the build break functions. In addition, the verified archive files may store the metadata of the above-noted functions and data as well as any previous versions of the functions and data.

One or more artifacts (e.g., data, executable computer programs, or discrete portions thereof) from the verified archive files or the entire archive file may be transformed to a different format using transformation functions. The transformation functions include instructions to transform and retain one or more of the data, the source identifier status code, the source location information of the data, the one or more functions, the checksum query, or the at least one validation function, in the transformed format. The transformation functions include instructions to retain copies or the metadata of the previous non-transformed or previously-transformed versions of the entire original executable computer program (e.g., archive) or artifacts therein, including the transformations functions previously executed on the archive or artifacts. In such a way, a user may be able to trace the exact transformations which have been performed on the original underlying executable computer program(s) (e.g., archives/artifacts), thereby making the transformed executable computer program immutable and traceable to its original format and content.

After or contemporaneously with a transformation on a particular executable computer program or set thereof, another build may be run to form another, transformed executable computer program in the transformed format. During this second build, the checksum query, the validation function, and the build-break function may be performed using the transformed checksum query and/or transformed validation functions in the transformed executable computer program to ensure the currentness and validity of the data. The transformed data, source identifier status code, the source location information of the data, the at least one function, the checksum query, and the at least one validation function, are released as transformed artifacts (e.g., transformed executable computer programs in the transformed format) in the verified archive file. In some examples, new validation functions may be added to the executable computer program and executed in the second build to test the validity of any transformed data or outputs of the transformed one or more functions. Additional transformations may be performed, and throughout all transformations, the validity and/or the currentness of the data may be confirmed at build time.

Despite any number of transformations, the chain of integrity of the data may be maintained from the acquisition to the use of the data by including the transformation function information (e.g., transformation function or transformation function location) and the metadata corresponding to previous versions of the transformed executable computer programs (e.g., artifacts containing the data, the source identifier status code, the source location information of the data, the one or more functions, the checksum query, and the at least one validation function) in the archive. These archives and/or artifacts can be used modularly and interchangeably in different combinations to form larger executable computer programs which perform the one or more functions on the data to provide an output. Such output can be trusted as being up-to-date and valid based on the tests built into the executable computer program.

By using the executable computer program and techniques disclosed herein, the data and output of the functions in the executable code of the executable computer program(s) (e.g., built code) are automatically confirmed as being "up to date" and valid, prior to use, by the existence of an executable computer program containing the functions. Such confirmation is provided regardless of the original form of the executable computer program such as when one or more transformations have been performed on the executable computer program or portions thereof. The executable computer programs and techniques herein allow users to treat the data as though it were a software dependency. As with other software dependencies, when the program is compiled all dependencies are resolved and included in the executable program. By including a verifiable archive as a dependency, a build system with dependency checking will package the data in the verifiable archive along with all of the other software dependencies, making them directly accessible at run time and without the need for an external database. The executable computer programs, methods, and systems disclosed herein eliminate the need for storing data in a separate database and programming that queries the separate database. Accordingly, the executable computer programs, methods, and systems disclosed herein increase compute speed (with respect to conventionally formed programs which require separate databases) by incorporating data directly into code. Further, the executable computer programs, methods, and systems disclosed herein automatically provide instant validation of the data used to perform the functions of the computer program.

FIG. 1A is a flow chart of a method 100 of validating data incorporated into a computer program, according to an embodiment. The method 100 includes an act 110 of building one or more functions incorporating data obtained from at least one remote location into a source code of the computer program. The method 100 includes an act 120 of incorporating a source identifier status code from the at least one remote location into the one or more functions, the source identifier status code corresponding to a date and a location at which the data was obtained from the at least one remote location. The method 100 includes an act 130 of writing a checksum query into the source code that queries the at least one remote location to determine if the source identifier status code matches a current source identifier status code at the at least one remote location. The method 100 includes an act 140 of providing at least one validation function in the source code, the at least one validation function being configured to perform one or more tests on the data to ensure the data is valid. The method 100 includes an act 150 of adding a build-break function into the source code, the build-break function providing that a computer program build continues only if the source identifier status code and the current source identifier status code match and the at least one validation function confirms that the data is valid. The method 100 includes an act 160 of running a build tool to perform a computer program build effective to compile the source code into an executable computer program that uses the data obtained from the at least one remote location to perform the one or more functions.

The method 100 may include more of fewer acts than the acts 110-160. For example, in some embodiments, the act 120 and the act 130, or the act 140 may be omitted form the method 100, with the subsequent acts being adjusted accordingly. Additionally, the acts of the method 100 may be carried out in a different order than presented. At least some of the acts 110-160 may be performed with or on a computer or computing device, such as one or more desktop computers, one or more laptop computers, one or more servers, one or more tablets, etc.

The method 100 includes the act 110 of building one or more functions incorporating data obtained from at least one remote location into a source code of the computer program. The one or more functions may include functions formulated to query the data for answers (e.g., outputs). The one or more functions may include value based queries (e.g., queries to determine an amount), identity based queries (e.g., queries to identify a specific piece or pieces of data, an input, or an output), logic based queries (e.g., if-then functions, sums, or other operations performed on the data to provide an output), binary queries (e.g., yes-no functions), or any other query that is answered using data. Accordingly, the query and the data can be included in a single function, which may be used as a modular building block of a larger computer program or application.

In some examples, building one or more functions includes creating the one or more functions in computer code, such as in a source code. The source code may be in an open standard format for electronic data. The open standard format may be a data exchange format. Examples of suitable open standard formats include Comma-Separated Values ("CSV"), Extensible Markup Language ("XML"), Hypertext Markup Language ("HTML"), JavaScript Object Notation ("JSON"), Computer Graphics Metafile ("CGM"), OpenDocument, Portable Document Format ("PDF"), Cascading Style Sheets ("CSS"), Portable Network Graphics ("PNG"), Scalable Vector Graphics ("SVG"), or any other open standard format.

In some examples, building one or more functions includes creating the one or more functions in a computer. In some examples, creating the one or more functions in computer code includes writing, programming, importing, or coding instructions for the functions in the source code. In some examples, building one or more functions incorporating data obtained from at least one remote location into the source code of the computer program includes archiving the data in the source code. The data may be written or imported into the source code as an archive, library, table, etc. Accordingly, the data used to perform the one or more functions is directly included in the source code.

In some examples, building one or more functions incorporating data obtained from at least one remote location into a source code of the computer program may only include building the data into the source code. For example, the data may be included (e.g., built, coded, imported, transformed) directly into the source code, such as in an object model (e.g., POM), as an archive, library, table, etc., for later use.

In some examples, the data may include electronic data such as standards (e.g., medical standards, laws, etc.), quantitative amounts (e.g., weights, account balances, ages, etc.), representative codes (e.g., item codes, insurance codes such as National Correct Coding Initiative ("NCCI") codes, etc.), experimental data, test data, or the like. The data may be accessed at, and obtained from, a remote location.

In some examples, the act 110 of building one or more functions incorporating data obtained from at least one remote location into a source code of the computer program includes accessing or obtaining the data at the at least one remote location. The at least one remote location may include an electronic address different from that of the electronic address of the computer in which the computer program (e.g., source code) is created. For example, the data may be obtained from a remote location that includes a website. The website may present the data as an official source of the data, such as laws, NCCI codes, account balances, environmental standards, safety standards, costs/prices, personal information, consumer data, educational data, experimental data, test data, etc. Accordingly, the website may be a website of an official source, such as the National Correct Coding Initiative policy manual archive at cms.gov, bank website(s), sources of statistical data such as data.gov, a website of a study (e.g., educational or research website), etc. The website may present the data in any open standard format, such as CSV, XML, HTML, PDF, etc. As discussed in more detail below, the website, and more specifically, the webpage containing the data may have a source identifier status code (e.g., checksum or hash) corresponding thereto.

In some examples, the computer program may include one or more functions each querying or referencing at least one set of data incorporated into the computer program. For example, each of a plurality of functions may reference the same or a different set of data (e.g., archive or library) incorporated into the source code. The act 110 of building one or more functions incorporating data obtained from at least one remote location into a source code of the computer program may include writing one or more functions in the source code that query data obtained from a remote website. In such examples, the data may have been reproduced in the source code and the source code may be in XML format.

The method 100 includes the act 120 of incorporating a source identifier status code from the at least one remote location into the one or more functions, the source identifier status code corresponding to a date and a location at which the data was obtained from the at least one remote location. In some examples, incorporating a source identifier status code from the at least one remote location into the one or more functions includes inserting the source identifier status code from the at least one remote location into the source code of the function that queries the data corresponding to the source identifier status code. In such examples, the function may include a query of the data and the corresponding source identifier status code from where, when, and the version of the data at the remote location. For example, the source identifier status code may be written into the program as a part of accompanying piece of data of the data archive or data library. The source identifier status code may be written into the program as a separate line of code associated with the data archive or data library. The source identifier status code may be incorporated into the code in the source code format.

The source identifier status code corresponds to a date and a location at which the data was obtained from the at least one remote location. For example, the source identifier status code includes a verified signature of the time, date, location, and version of the webpage or other document (including all data thereon) from which the data is obtained. In some examples, the source identifier status code includes a checksum or hash of the remote location. For example, the source identifier status code includes a checksum or hash of the webpage or other document from which the data is obtained. In some examples, incorporating a source identifier status code from the at least one remote location into the one or more functions includes obtaining or generating (e.g., with a hash function) the hash for data at the remote location from the time the data was collected. The checksum or hash includes a plurality of characters produced by a function (e.g., checksum or hash functions/algorithms such as SHA-512, SHA-256, etc.) corresponding to the data at the remote location as the data, time, and version that the data is accessed or obtained. Accordingly, the data is associated with the source identifier status code at the point in time at which the data was gathered. If the data changes at the source in the slightest, the corresponding checksum or hash calculated therefrom will change by more than one character compared to the original checksum or hash generated when the data was originally obtained. Accordingly, a change in the checksum or hash can be used as an indication that the data has changed.

In some examples, incorporating a source identifier status code from the at least one remote location into each of the one or more functions may include incorporating a checksum or a hash from a uniform resource identifier corresponding to the at least one remote location into the one or more functions. The source identifier status code may be stored with the address of the at least one remote location from which the source identifier status code (and associated data) is obtained. For example, the source identifier status code may be stored in the function (in source code format) with the uniform resource locator ("URL") of the webpage where the data was obtained, a database location where the data was obtained, or a file directory address where the data was obtained. Thus, the source code includes code (e.g., information) that allows the computer program to access the remote location. In embodiments, the source code includes the website or webpage address of the at least one remote location. In some examples, the source identifier status code may be placed directly into a checksum query corresponding to the data, source identifier status code, and the remote location.

The method 100 includes the act 130 of writing a checksum query into the source code that queries the at least one remote location to determine if the source identifier status code matches a current source identifier status code at the at least one remote location. In some examples, writing a checksum query into the source code includes incorporating the checksum query into the source code in the open standard format. The checksum query examines the source identifier status code incorporated into the source code and the current source code status identifier of the at least one remote location corresponding to the data. The checksum query includes instructions to retrieve the current source identifier status code at the at least one remote location corresponding to the data (and corresponding to the source identifier status code).

The current source identifier status code is the source identifier status code of the remote location at the date the checksum query is run. The current source identifier status code may include a current checksum or current hash. The current checksum or current hash at the time the checksum query is run may be the same as, or differ from, the checksum or hash from the time when the data was obtained. Checksums and hashes are dependent upon the data for which they are created. For example, a checksum may change (e.g., by one or more characters) when the data for which the checksum is created is altered in even the slightest degree. Additionally, checksums and hashes cannot feasibly be replicated with different data or back-calculated using current techniques and computing capabilities. Therefore, comparing checksums and hashes can provide a reliable indication of whether data has changed at the remote location.

As the source identifier status code and current source identifier status code each include a checksum or hash (e.g., current checksum or current hash), the source identifier status code will only match the current source identifier status code if the data at the remote location has not changed. The checksum query may compare the source identifier status code and the current source identifier status code on a character-by-character basis to ensure the source identifier status code and the current source identifier status code match. A match indicates that the data associated with the source identifier status code is up-to-date. The match indicates that the user can trust that the outputs of the one or more functions are based on current data and will provide current outputs or results.

The act 130 of writing a checksum query into the source code includes programming (e.g., coding) a query into the source code that includes instructions to compare the characters of the checksum or hash of the remote location at the time the data was initially retrieved with the characters of the present checksum or hash at the remote location where the data was retrieved. The at least one remote location can include a webpage, database, computer file, software file, etc. Accordingly, the checksum query determines if the source identifier status code matches the current source identifier status code at the at least one remote location, thereby verifying the data associated therewith. For example, the checksum query may examine a correspondence between the source identifier status code stored in the source code and the current source identifier status code at a uniform resource locator of the at least one remote location corresponding to the source identifier status code.

The method 100 includes the act 140 of providing at least one validation function in the source code, the at least one validation function being configured to perform one or more tests on the data to ensure the data (and functions based thereon) is valid. Providing at least one validation function in the source code may include providing at least one validation function in the source code in the open standard format. The at least one validation function may be used to confirm the validity of the data and/or the functions using the data, against a standard. For example, the at least one validation function may include a test and/or standard against which the data is compared according to the at least one validation function. In examples, providing at least one validation function in the source code includes providing a function which tests the data to confirm that the data is in a format specified by the source code.

In embodiments, the at least one validation function may include a function which tests one or more of the data, at least one function which incorporates the data, or outputs based on the data in order to determine if the at least one function and data is in a selected format (e.g., XML, HTML, CSV, Avro, XL, XLS, JSON, etc.) or provides a selected output. For example, the validation function may include code (computer readable and executable instructions) that directs a build tool to read a data string (e.g., data) to determine if the format of the data in the data string matches a selected format. The selected format may be a format which is used by an associated build tool or transformation function. For example, the format may be a programming language which is used by the transformation function to transform the at least one function and data into a second language (e.g., computer code or file format). In examples, the validation function may include a template or set of rules to compare the format of the source code to a specified (e.g., desired or selected) format defined by the template or set of rules to ensure the at least one function and data in the source code are in the specified format.

In examples, providing at least one validation function in the source code, the at least one validation function being configured to perform one or more tests on the data to ensure the data is valid includes providing at least one validation function which tests the data to confirm that the data contains values that satisfy one or more criteria of the at least one validation test. For example, the at least one validation function may include code (e.g., a set of machine readable and executable instructions in the source code) to ensure that the data in the source code contains specific data values, such as having a date column in a specified position or values in a specific range for the data in at least one of the columns.

In examples, the at least one validation function may include code to compare the data in the source code to a selected data format or presentation criteria such as to determine if the data contains a specific number of columns and/or rows of data. For example, the at least one validation function may include code that directs the build tool to determine if the data in the source code is arranged in columns and rows matching a specified number of columns and rows.

In examples, the at least one validation function may include code which directs the build tool to confirm that the data (e.g., rows and columns that include the data) has values within a specified range of values. For example, at least one validation function may be written that expects four columns of data, the first column is a date column, the second column is a floating point number column, the third column is a string that starts with "A," "B," or "C," and the fourth column is a number that increases by one for each row of data in the file. The validation function may check that the data is valid by searching the data to confirm that the data is as expected in the locations (e.g., columns and rows). In examples, the at least one validation function may direct the build tool to run a function which compares random samples or all of the data to a specified range of expected values. In such examples, the specified range of expected values may include dates, identification numbers (e.g., social security number, driver's license number, customer number, claim number, etc.), amounts (e.g., account balance, items in stock, consumed resources, etc.), a code value (e.g., NCCI code, penal or municipal code number, etc.). Accordingly, the at least one validation function may include instructions which state the acceptable range of values (or units of measure) in which the data may be determined as valid. The at least one validation function may directly compare the value(s) of data to the acceptable range(s) associated therewith. If the value(s) of the data is within the acceptable range, then the data is considered valid.

In examples, the at least one validation function may include code which contains one or more sub-functions that provide one or more outputs based on one or more pieces of data within the source code. The one or more sub-functions may direct the built tool to run the at least one function on the data (e.g., utilizing random samples in the data) and provide one or more outputs based thereon. For example, the sub-function(s) may perform one or more operations on or with the data to provide an output and the at least one validation function may include a range of acceptable outputs (or even formats of the output). The at least one validation function may compare the one or more outputs to the acceptable range(s). If the outputs of the sub-function(s) are within the range of acceptable outputs (or format), then the data is considered valid. In an example, the at least one a sub-function may perform mathematical operations on the data and provide an output.

In examples, the at least one sub-function may include an independent function which performs the same operations on the same data as the one or more functions (e.g., as directed by the sub-functions(s)) and provides an independent result. The independent result can be compared to the expected output of the one or more functions to determine validity of the one or more functions and/or data. For example, the independent function may be known to produce valid outputs upon performing one or more operations therein and the outputs of the one or more functions may be compared to the output of the independent function to determine if the one or more functions provides valid outputs. In such a manner, the validation function containing the at least one sub-function may be used to determine if the one or more functions, data, or both is valid, at build time.

Similarly, the independent function can be known to produce valid outputs only for data values within a data value range or ranges determined to be valid. By comparing the outputs of one or both of the independent function or at least one function to a value range of valid outputs, the validity of the at least one function and/or data can be determined via the output.

The method 100 includes the act 150 of adding a build-break function into the source code, the build-break function providing that a computer program build continues only if the source identifier status code and the current source identifier status code match and the at least one validation function confirms that the data is valid. In some examples, adding a build-break function into the source code includes incorporating (e.g., coding, typing, importing, programming) the build-break function into the source code in the open standard format. The build-break function includes instructions to terminate a build if the source identifier status code does not match the current source identifier status code and/or the at least one validation function confirms that the format or value(s) of the data is not valid. Accordingly, the build-break function prevents a program build from completing if the data is not up to date (as signified by the mismatch between the source identifier status code and the current source identifier status code) or valid (as determined by the at least one validation function). For example, the build break function may be similar or identical to dependency checking for checking software library dependencies. If the dependency cannot be satisfied, either because it is unreachable or its tests fail, then the build will break. Although traditionally treated differently than software libraries, the computer programs and techniques disclosed herein treat data sets as though they were just another software library.

If the build program outputs an executable computer program, the user can be sure that the data is current (e.g., verified as the latest version of the data) as demonstrated by the lack of a build-break which indicates the source identifier status code matches the current source identifier status code, which further indicates the data did not change at the source (remote location). The user can be assured the data in the one or more functions is current and valid by the mere presence of the executable computer program (e.g., application). Accordingly, the build-break function provides a readily recognizable means of determining if an executable computer program containing the one or more functions uses up-to-date (e.g., current) data. The check of the provenance of the data may only be performed once during a build for each set of data and associated functions in the source code. Subsequently, the build tool or subsequent build tools may assume the data is up to date if the data is referenced again in a later function or dependency.

The build-break function includes instructions to terminate a build if the at least one validation function determines that the data is not valid. Accordingly, the build only continues if the at least one validation function determines that the data is valid. For example, the build-break function directs the build tool to continue the build only if the at least one function and data are in a correct format (e.g., source code is in the selected format) and/or the data has values that satisfy the at least one validation function. The build-break function may direct the build tool to continue the build only if an output of the at least one function and the output of the independent function (both as directed by the at least one validation function) match or have values that fall within a range known to be valid. If the build tool outputs an executable computer program, the user can be sure that the data therein is valid as verified by the at least one validation function. Such validation demonstrates that at build time the data satisfies the same validation functions or other tests as when obtained from the remote location.

The method 100 includes the act 160 of running a build tool to perform a computer program build effective to compile the source code into an executable computer program that uses the data obtained from the at least one remote location to perform the one or more functions. In examples, the build tool includes coding that forces dependency checking to ensure that the data is valid throughout a string of dependencies. The build tool may include Apache Ant, Apache Maven, Gradle, MSBuild, Simple Build Tool (sbt), Waf, or the like. For example, running a build tool to compile the source code into an executable computer program may include running Apache Ant, Apache Maven, Gradle, MSBuild, sbt, or Waf build tools.

The executable computer program may be output in verified archive format such as in JAR file format. The executable computer program may include any of those components disclosed herein as artifacts, such as an executable code for running the one or more functions on the data, the data, the checksum query, the source identifier status code, the at least one validation function, etc. The executable computer program may include artifact or archive containing data that is ensured to be valid and current. For example, the executable computer program (e.g., archive or artifacts therein) may include a portion of or an entire portion of executable code containing the data. For example, the executable computer program includes executable code for the one or more functions which utilizes the data to provide an output. The executable computer program may include executable code for a discrete number of the one or more functions, such as in a modular format wherein the one or more functions may be utilized as a portion of code to perform the one or more functions with the up-to-date and validated data. The executable computer program (e.g., application) may be incorporated into a larger computer readable and executable program as a modular component thereof. In some examples, a plurality of executable computer programs may make up portions of the larger computer readable and executable program as modular components thereof. for example, a larger executable program may include a plurality of executable computer programs therein, including the data and one or more functions of each.

In some examples, the executable computer program (e.g., archive or other deployable artifact) may include the data only, such as in a modular format wherein the data may be utilized in a dependency. The data is not executable on its own but may be incorporated into a larger executable program as a dependency as though it were just another software library. For example, data of an executable computer program (e.g., validated and current data archive) may be incorporated into a function of a larger executable computer program, wherein the function performs one or more operations on the data to provide an output based thereon.

In some examples, one or more of the source code or the executable computer program (e.g., artifact or application) may be further processed via one or more transformation functions, wherein all of the functions, validation functions, checksum queries, data strings, source identifier status codes, etc. in the source code are preserved and translated during the transformation into a new format. For example, the transformation function may be a program, a portion of a build tool, or other tool which transforms the source code (including the functions and data therein) from a first format (e.g., CSV) to a second format (e.g., XML). Further, the transformation function or a reference location thereof may be incorporated into the source code to ensure the transformed source code carries with it all information used to make the (current) transformed executable computer code. Accordingly, the resulting transformed executable computer code carries with it all of the information of the original source code and previous versions of executable computer code, with the addition of information about the transformation function, as discussed in more detail below. In such examples, the executable computer program or the source code can be transformed from one format to another while maintaining both the provenance of the data and the validity of the data in addition to allowing users to track the origin of the data and what was done with the data during the build or execution (e.g., which functions were used to provide an output with the data).

In some examples, the transformation function may be a function or larger executable computer program which utilizes one or more executable computer programs (e.g., artifacts or applications) or data as one or more dependencies. Upon executing a build and transformation or a build of the larger executable computer program, the dependencies are checked (e.g., the validation functions are run on the executable computer program or data in each dependency) according to the associated validation functions of the dependencies. Thus, the data in an output executable computer program is ensured to be valid no matter where the data is located (e.g., in the executable computer program or dependency thereof) or what form the data is in, by the mere existence of the executable computer program. Accordingly, the data and/or functions including the data in the executable computer programs can be used as modular components (e.g., verified archive file building blocks) of larger executable computer programs while maintaining the validation and provenance of the data.

The build tool compiles, links, and packages the source code from the source code format (e.g., in the Project Object Model ("POM") file of Apache Maven according to Source Code Management ("SCM") commands therein) into a usable or executable format. For example, the build tool may compile the source code into an executable computer program, further compilable format, or further transformable format. The build tool checks current status of the data in the source code via dependency checking (e.g., running the checksum queries) during the build. The build tool also forces checks on the validity of the data in the source code via validation functions during the build. The executable computer program may be output in a verified archive format with the data incorporated therein as one or more verified libraries. The verified archive format may be a signed Java Archive ("JAR") file or the like. The data may be stored in the JAR file in zip format, tar format, or any other suitable format compatible with JAR files. As a JAR file can be included in a classpath for an application, the JAR file allows the application to treat the data therein as code. For example, a Java Virtual Machine may specify the classes and packages, as directed from the classpath containing the JAR file, to utilize the data therein as code. Accordingly, the data and functions in the JAR file can be utilized as code for a program after it is checked (e.g., by the checksum query or validation functions) to verify it is current and/or valid. In some examples, one or more JAR files including data obtained from a remote location (along with the corresponding source identifier status codes, associated checksum queries, and validation functions) may be included in one or more classpaths of a larger executable computer program. Accordingly, a Java Virtual Machine may specify the location of the code in the program corresponding to the data (e.g., library) and functions related thereto, including the checksum queries and validation functions, at build time, upon transformation, or upon command to execute the program. In examples, a Java Compiler may compile the code and specify the location of the current and validated data alone (e.g., library) and/or the functions that use or operate on the data, for later execution. Accordingly, the method 100 may produce archives (e.g., deployable artifacts containing the data) for incorporation in larger executable computer programs, wherein the archives retain all of the information and functions necessary to check the currency and validity of the data in the archives, as well as perform the one or more functions on the data.

The checksum query, the validations functions, and the build-break function provide instructions for checking dependencies and continuing or stopping a build based on the current status and validation of the data in the one or more functions. This check can be performed on each dependency of a plurality of dependencies in a executable computer program, whether being built from source code or transformed from one executable computer program format to another. Accordingly, the build tool completes a build of the executable computer program containing the one or more functions only if the checksum query determines that the source identifier status code matches the current source identifier status code of the remote location and the at least one validation function confirms that the data is valid. The build tool compiles the one or more functions and data to the executable format in the executable computer program, such as in a JAR file. The build tool may also compile one or more of the checksum query, the validation function(s), and the build-break function to the executable format in the executable computer program. The build tool executes the checksum query, the validation function(s), and the build-break function. The presence of an executable computer program after the build indicates that the data in the one or more functions of executable computer program is current (e.g., up to date at the remote location) and valid.

In some examples, running a build tool to perform a computer program build effective to compile the source code into an executable computer program that uses the data obtained from the at least one remote location to perform the one or more functions includes breaking the build (e.g., not outputting an executable computer program) if the source identifier status code does not match the current source identifier status code or if the data is not valid according to the at least one validation function. A build-break shows the data in the one or more functions of the source code is not up to date or valid. In some examples, the source code may include a report function that provides a report of any mismatch between the source identifier status code and the current source identifier status code; of the invalidity of the data and/or the at least one function, output thereof, output of the independent function, and values associated therewith (e.g., determined by the validation functions); and identifies the data associated therewith. The report function can provide an output (via a side process in the build) to inform a user of the specific data and remote location corresponding to the mismatch between the source identifier status code and the current source identifier status code, a mismatch in format between the source code and a selected code, a mismatch between the output of the at least one function and the output of the independent function (both as directed by the at least one validation function), or a mismatch in value(s) between the value determined by the at least one validation function and an acceptable range of values. The output can be human or machine-readable text providing the remote location and data library, such as a URL and description of the data at the URL. The output can be directed to a user interface, such as a computer screen of the computer used to perform the build (e.g., containing the build tool). Accordingly, the user or coder may be able to identify the data and the remote location associated therewith to replace the data and the associated source identifier status code in the one or more functions of the source code. After the source code is updated (e.g., fixed or transformed), the build tool may be rerun to retest the data and output the executable computer program as disclosed herein.

The executable computer program(s) (e.g., archives) may be stored in a repository. The executable computer program(s) containing the one or more functions and data or the entire repository may be accessed and used to form larger executable programs that include a plurality of executable computer programs (e.g., executable code to perform the one or more functions on the data) and/or may be transformed to another format as discussed in more detail below.

The method 100 may further include performing or building one or more transformations on the executable computer program (or source code). For example, a transformation function may be built and executed in a build that transforms the executable computer program and all or some of the information associated therewith (e.g., data, one or more functions, source identifier status code, remote location information, checksum query, validation functions, and build-break functions in an artifact file) from a first format to a second format. All of the information associated with the executable computer program may be transformed and retained during the transformation, such as in the verified archive format (JAR file) output of the transformation and build. Accordingly, the source code can be released from a build in a first format (as executable computer code) and be transformed into one or more additional formats by subsequent transformation(s) and builds, all while retaining the original information associated therewith (e.g., data, one or more functions, source identifier status code, remote location information, checksum query, validation functions, and build-break functions). Thus, despite changing the form of the artifacts in the executable computer program (e.g., executable code and information associated therewith to a new format or language), the artifacts retain the provenance and validity confirmations of the original source code.

In some examples, performing or building one or more transformations on the executable computer program or source code may include running a transformation function on the executable computer program during a build to transform the executable computer program from the first format to the second format. In some examples, the first format may be CSV format and the second format may be Apache Avro format. In some examples, the first format may be CSV format and the second format may be JSON format. In some examples, the first format may be XML format and the second format may be HTML format.

Transformation functions may include functions that transform the data (e.g., perform operations on the data) to form subsets or altered versions of the data. For example a transformation may pull only data with certain values or from certain position in a table to form a subset of the original data as a new dataset. In examples, the transformation function may perform one or more mathematical operations on the data, such as adding, multiplying, dividing, etc. the values of the data by a second value to output a selected new dataset. The new dataset may be operated on by new functions written into the new build tool or executable computer program to provide outputs to new queries on the subset of the original data. Corresponding new validation functions may be written into the new build tool or executable computer program (prior to transformation) to ensure the validity of the new dataset.

By building and running transformations, the transformed executable computer programs or portions thereof, including all or some of the data and functions, are treated like a dependency in software. Accordingly, when run, the build system must resolve dependencies to other imported archives or artifacts (e.g., executable computer programs containing functions, data sets, etc.). Through this process, the build will run any tests specified in the dependencies, such as validation functions, checksum queries, or build break functions. If any of the tests for these dependencies fail, the build breaks.

Accordingly, the methods disclosed herein enable transformation of data from archives (e.g., verified archive format files that store executable code with different functions or data) in separate repositories or the same repositories which are then treated as dependencies and checked/tested during a build. The build system will run the tests for all of the dependent artifacts (e.g., data alone or data and functions), no matter the location of the source archive. If any of the tests for these dependent artifacts fail, the build breaks. Accordingly, the transformed executable computer programs are only released as output if all dependencies are confirmed as valid and up-to-date.

For example, if a user wants to pull out all of the data that starts with "A," but not "B," or "C" from a third column of an original dataset, the new dataset would be a new artifact that is based on the original data. Such selective extraction would transform the original data into the new data or dataset. New validation functions may be written and used to confirm that the data in the new dataset is valid according to the parameters of the new dataset or selected outputs of the one or more functions operating on the new dataset. For example, one or more tests to verify that the new dataset includes only rows with "A" in the data (e.g., strings) found in the third column. In some examples, when the build system runs the tests for the transformed executable computer program containing the new dataset, the build system may assume that the original data used to form the new dataset is valid. In some examples, when the build system runs the tests for the transformed executable computer program containing the new dataset, the build system may discover the dependency to the original dataset and may run the original validation tests against original dataset. Accordingly, all dependencies and data may be checked for validity and/or currentness at build time.

Another transformation may include manually curated data. For example, in some embodiments, data may be manually acquired from a document or other source with data scattered throughout, such as a PDF document. Automatically pulling the data out may be beyond the capabilities of contemporary software and so must be curated manually. Such manual curation is a transformation based on the difference between the manually curated data and the original PDF document. The build system may run a provenance check (e.g., checksum query) on the original and tests (e.g., validation functions) written for the manually curated data. Accordingly, the build process may treat the manually curated data in a manners similar to imported data and check the dependencies thereof with at least a checksum query and validation functions.

The method 100 may further include incorporating one or more executable computer programs into a larger executable computer program. For example, a plurality of executable computer programs (e.g., artifacts or archives) may be assembled to form the larger executable program which performs the one or more functions on the respective data associated each executable computer program. Accordingly, larger executable computer programs which perform a plurality of functions on a plurality of datasets can be modularly constructed and executed.

According to the method 100, the data can be treated in the same way as software, thereby removing the "out of band" processes for data and eliminating any uncertainty or errors associated therewith. By incorporating data and provenance and validity tests directly into the source code, a concrete immutable relationship is formed between the executable computer program and the data it uses.

The method 100 automatically provides validated data in functions of an executable program without the need for manually checking or updating the data itself. Further, the method 100 eliminates the need to store data on databases separately from the code and the wait time of accessing the remote databases to retrieve the data. Accordingly, the method 100 provides for faster compute times, less data storage outside of the code, and verified accuracy over conventional techniques for using data in computer programs.

Figure 1B:
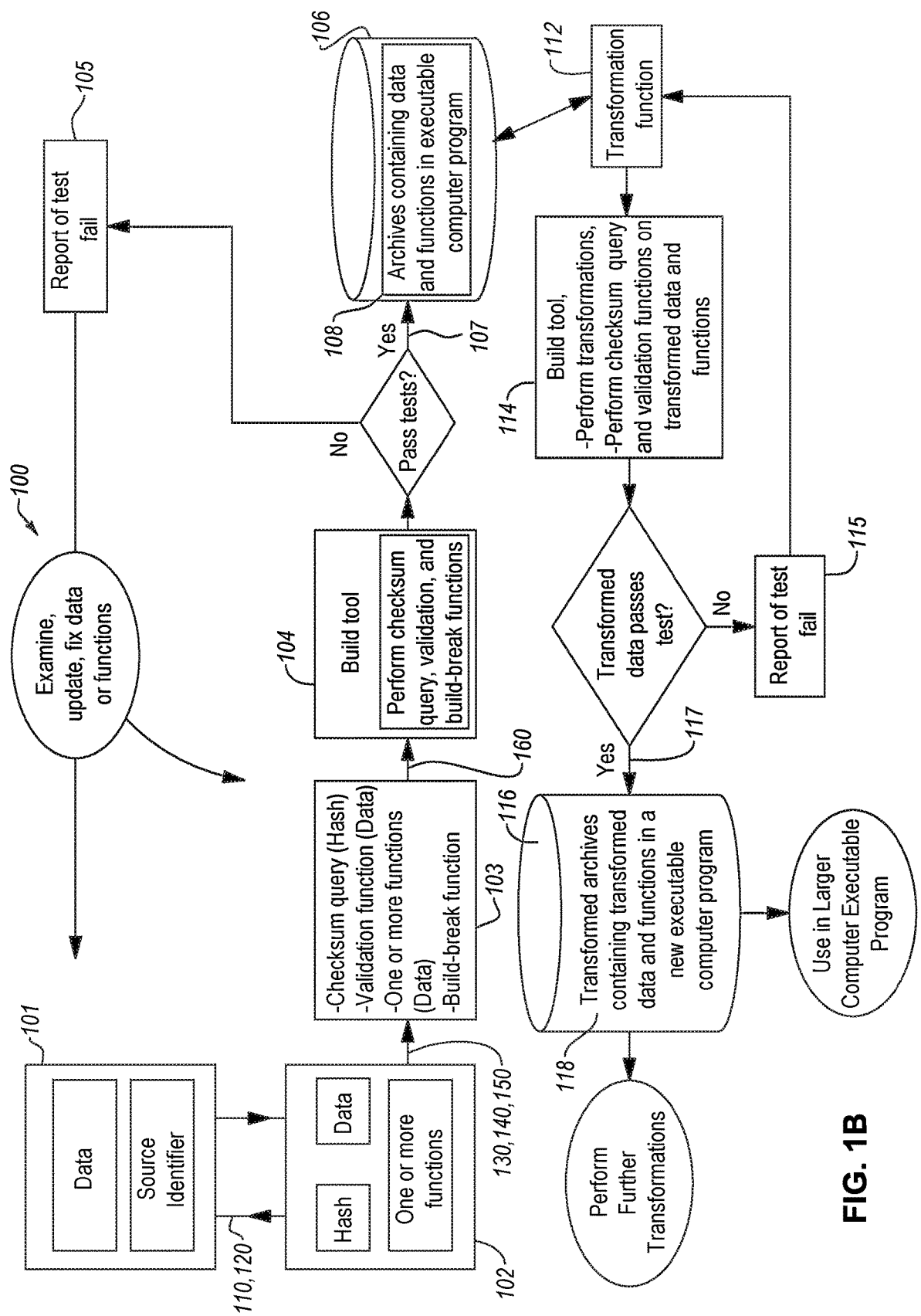
FIG. 1B is a schematic of the method of FIG. 1A.

FIG. 1B is a schematic of the method 100 of FIG. 1A. The method 100 includes the act 110 of building one or more functions incorporating data obtained from at least one remote location 101 into a source code 102 of the computer program. The method 100 includes the act 120 of incorporating the source identifier status code from the at least one remote location 101 into the one or more functions, the source identifier status code corresponding to a date and a location at which the data was obtained from the at least one remote location 101. The method 100 includes the act 130 of writing a checksum query into the source code 102 that queries the at least one remote location 101 to determine if the source identifier status code matches a current source identifier status code at the at least one remote location 101. The method 100 includes the act 140 of providing the at least one validation function in the source code 102, the at least one validation function being configured to perform one or more tests on the data to ensure the data is valid. The method 100 includes the act 150 of adding the build-break function into the source code 102, the build-break function providing that a computer program build continues only if the source identifier status code and the current source identifier status code match and the at least one validation function confirms that the data is valid. The method 100 includes the act 160 of running a build tool 104 to perform a computer program build effective to compile the source code 102 into an executable computer program that uses the data obtained from the at least one remote location 101 to perform the one or more functions.

The data may be obtained from the remote location 101 via manual input or download. The source identifier status code may be obtained contemporaneously with the data acquisition. The data may be incorporated in raw form, such as in the format found at the remote location 101 or may be transformed into a selected format such as the format of the source code 102. The source identifier status code may be a hash obtained from a hash function run on the remote location or data obtained therefrom. The source code 102 may include one or more functions for performing operations using the data. As shown, acts 130-150 may be performed on the source code 102 to form the source code 103. The source code 103 may include the data, the source identifier status code, the checksum query, the at least one validation function, one or more functions, and the build break function.

At act 160, a build tool 104 may be run on the source code 103. For example, the build tool 104 may include executable instructions to convert the source code into an executable computer program or intermediate version thereof (programming format that is convertible to executable computer program). The build tool 104 includes programming (e.g., coding) which causes a computing system to perform the checksum query and the one or more validation functions to confirm that the data is or is not current and valid. Only if the data is confirmed as current and valid, the build tool outputs 107 the executable computer program 108 (e.g., an archive file) that contains the data, one or more functions, checksum query, at least one validation function, the source identifier status code, remote location information, etc., such as in JAR file format. The executable computer program 108 is output to the file repository 106.

If the data is determined to be not current or not valid, the build tool 104 may output a report 105 of the failure of the test(s). The build tool 104 may include executable instructions to produce the report 105. The report 105 may include identification of the cause of the failure of the test(s), such as the hash or data associated with a hash that fails the checksum query, or the data that fails the validation function. The report 105 may include the remote location of the data. Accordingly, a software programmer may examine, update, or fix the data or functions in the source code 102 or 103 to allow a build to progress. By stopping the build, the build-break function ensures that only executable computer programs that have valid and current data are output.

As noted above, the executable computer program 108 (e.g., archive file) is output 107 into the file repository 106. The executable computer program 108 may be accessed in the repository 106. For example, the executable computer programs 108 may be used to form the larger executable computer program or may be transformed to a new format using a transformation function.

As shown, a transformation function 112 may be built which includes executable instructions for transforming the executable computer program 108 or portions thereof from a first format to a second format. As noted above, the transformation may be performed on some or all of the executable computer program 108, such as the data and functions (e.g., checksum query, one or more functions, at least one validation function, the build-break function, etc.) in the executable computer program. For example, the transformation may be performed on some or all of the artifacts in the archive file. The original form and transformed form of the data and functions may be stored in the transformed executable computer program 118, such as in metadata format or version specific files of a JAR file. The transformation function 112 used to transform the executable computer program may be stored in the transformed executable computer program 118 as well. Accordingly, version specific information and how said versions were made is stored to provide full accountability of the means of producing the current executable computer program.

The transformation function(s) 112 are included in the subsequent build tool 114, which performs the transformations. The build tool 114 then runs one or more of the checksum query or the at least one validation function on the data according to the transformed validation functions and transformed checksum query. If the transformed executable computer program (e.g., artifact) passes the transformed tests, the transformed executable computer programs 118 are output 117 into the transformed file repository 116. The transformed executable computer programs 118 contain all of the information of the previous version(s) of the transformed executable computer programs 118, such as the original or previous executable computer program 108. Accordingly, all information about the executable computer program or artifacts therein, including data, transformation functions, source identifier status codes, checksum queries, validation functions, etc., are contained in the executable computer program, such as in JAR file format. Accordingly, the tests are performed on any data or subset thereof that has a dependency to the original data. Further, by passing the transformed validation functions and checksum query, the transformed data is verified as up-to-date and valid.

If the transformed executable computer program or artifact(s) therein does not pass the transformed tests, a report 115 of the failed tests may be output. A software programmer may then check or fix the transformation function, examine the data at the remote location 101, reacquire the data from the remote location 101, or otherwise inspect and correct any of the inputs to the method 100.

As noted above, the transformed executable computer programs 118 can be used in larger executable computer programs, such as modular building blocks of a program which analyzes pluralities of data according to a plurality of functions to provide one or more outputs. Additionally, further transformations may be carried out on the transformed executable computer programs 118, all while retaining the previous information (e.g., data, one or more functions, source identifier status code, at least one validation function, etc.) and previous version(s) of the transformed executable computer programs 118, such as in metadata or file directories within the executable computer program (e.g., verified archive format file).

Figure 2:
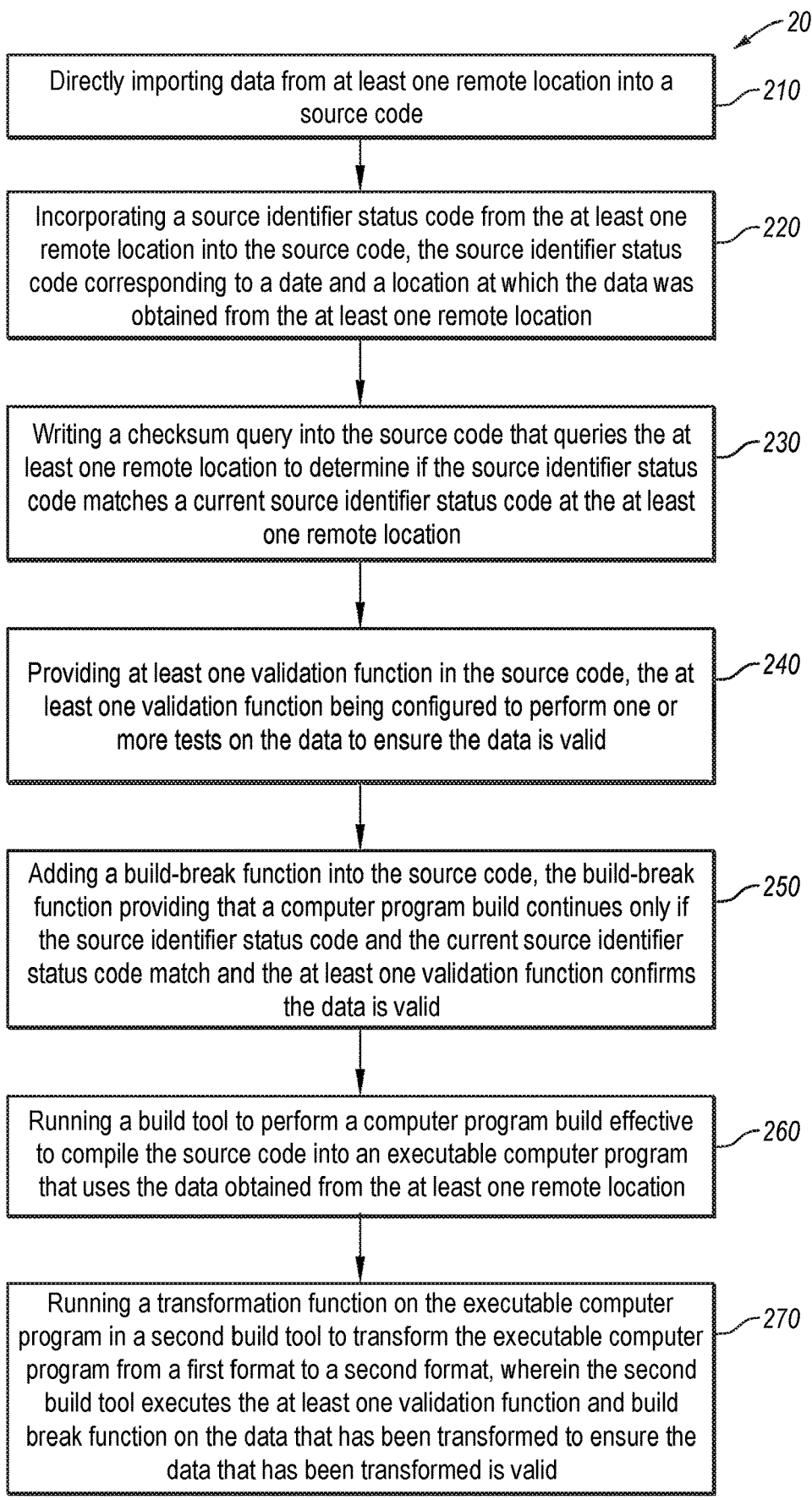
FIG. 2 is a flow chart of method of building a computer program using data incorporated therein, according to an embodiment.

FIG. 2 is a flow chart of method 200 of building a computer program using data incorporated therein, according to at least one embodiment. The method 200 includes the act 210 of directly importing data from at least one remote location into a source code. The method 200 includes the act 220 of incorporating a source identifier status code from the at least one remote location into the source code, the source identifier status code corresponding to a date and a location at which the data was obtained from the at least one remote location. The method 200 includes the act 230 of writing a checksum query into the source code that queries the at least one remote location to determine if the source identifier status code matches a current source identifier status code at the at least one remote location. The method 200 includes the act 250 of providing at least one validation function in the source code, the at least one validation function being configured to perform one or more tests on the data to ensure the data is valid. The method 200 includes the act 250 of adding a build-break function into the source code, the build-break function providing that a computer program build continues only if the source identifier status code and the current source identifier status code match and the at least one validation function confirms the data is valid. The method 200 includes the act 260 of running a build tool to perform a computer program build effective to compile the source code into an executable computer program that uses the data obtained from the at least one remote location. The method 200 includes the act 270 of running a transformation function on the executable computer program in a second build tool to transform the executable computer program from a first format to a second format, wherein the second build tool executes the at least one validation function and build break function on the data that has been transformed to ensure the data that has been transformed is valid.

The method 200 may include more of fewer acts than the acts 210-270. For example, the act 270 may be omitted in some examples. Additionally, the acts of the method 200 may be carried out in a different order than presented. At least some of the acts 210-270 may be performed by, with, or on a computer or computing device, such as one or more desktop computers, one or more laptop computers, one or more servers, one or more tablets, etc.

The act 210 of directly importing data from at least one remote location into the source code may include downloading the data from the at least one remote location into the source code, such as placing the data in a library in a POM. Importing data from at least one remote location into the source code may include downloading the data from a webpage, a database, an archive, a library, or any other electronic source. In some examples, importing data from at least one remote location into the source code may include downloading the data in the format provided at the at least one remote location (e.g., HTML) and converting the data into source code format (e.g., XML). In some examples, importing data from at least one remote location into the source code may include downloading or otherwise incorporating the data directly into one or more functions of a computer program (e.g., the program specified by the totality of the source code). For example, the data may be imported as a library into the source code of the computer program in one or more functions therein. The one or more functions written in source code and containing the data (and associated source identifier status code and remote location address) may be used as blocks to build the computer program and resulting executable computer program. The data may be deposited in a library in or associated with the source code, and may be referenced by the one or more functions. Accordingly, the data is included with the one or more functions in the source code.

In some examples, directly importing data from at least one remote location into a source code includes manually building the library of data in the source code, such as in a POM. In some examples, directly importing data from at least one remote location into a source code includes using a standard dependency import mechanism of a build tool that enforces dependency checking. In such examples, the source code may include an address of the remote location (e.g., the address of a database, web page etc.) or position (e.g., directory or repository) within the POM that the data resides. In some examples, the build tool may import the data during the build, responsive to the import command and the address of the remote location in the source code. In such examples, directly importing the data from the at least one remote location into the source code may include importing the data from the remote location during the build into the one or more function and outputting the data as executable computer code or compilable computer code. The build tool may include any of the build tools disclosed herein, such as Apache Ant, Apache Maven, Gradle, MSBuild, sbt, or Waf.

The source code of the computer program (e.g., the code prior to running the build tool) may include one or more functions which utilize the data. For example, the one or more functions may query the data for answers to a question. Examples of the types of functions and queries are disclosed herein. The source code may be in an open standard format for electronic data transfer, such as XML or the like.

The act 220 of incorporating a source identifier status code from the at least one remote location into the source code, the source identifier status code corresponding to a date and a location at which the data was obtained from the at least one remote location may be similar or identical to the act 120 disclosed above, in one or more aspects. For example, incorporating the source identifier status code from the at least one remote location into the source code may include providing the checksum or hash from the remote location into the source code associated with the data. In some examples, incorporating the source identifier status code from the at least one remote location into the source code may include providing the checksum or hash of the remote location in one or more functions of the source code. Incorporating the source identifier status code from the at least one remote location into the source code includes adding the checksum or hash into the source code. In some examples, incorporating the source identifier status code from the at least one remote location into the source code includes downloading the source identifier status code into the source code.

In some examples, incorporating a source identifier status code from the at least one remote location into the source code includes associating the source identifier status code with the data in the source code. For example, associating the source identifier status code with the data in the source code may comprise incorporating the source identifier status code and the data in a single function.

The act 230 of writing a checksum query into the source code that queries the at least one remote location to determine if the source identifier status code matches a current source identifier status code at the at least one remote location may be similar or identical to the act 130 disclosed above, in one or more aspects. For example, writing the checksum query into the source code may include incorporating the checksum query into the source code in the open standard format. The checksum query examines the source identifier status code incorporated into the source code and the current source code status identifier of the at least one remote location corresponding to the data. The checksum query includes instructions to retrieve the current source identifier status code at the at least one remote location corresponding to the data (and corresponding to the source identifier status code). For example, the checksum query examines the correspondence between the source identifier status code and the current source identifier status code at a remote location (e.g., URL) corresponding to the source identifier status code.

The act 240 of providing at least one validation function in the source code, the at least one validation function being configured to perform one or more tests on the data to ensure the data is valid may be similar or identical to the act 140 disclosed above, in one or more aspects. For example, the at least one validation function includes a test and/or standard against which the data is compared. The at least one validation function may be written into the source code, such as in the open standard format. In examples, providing at least one validation function in the source code, the at least one validation function being configured to perform one or more tests on the data to ensure the data is valid may include providing a function which tests the data to confirm that the data is in a format specified by the source code or provides or contains values that meet an expected target value or range.

The act 250 of adding a build-break function into the source code, the build-break function providing that a computer program build continues only if the source identifier status code and the current source identifier status code match and the at least one validation function confirms the data is valid may be similar or identical to the act 150 disclosed above, in one or more aspects. For example, adding a build-break function into the source code may include incorporating (e.g., coding, typing, programming) the build-break function into the source code in the open standard format. The build-break function includes instructions to terminate a build if the source identifier status code does not match the current source identifier status code and the at least one validation function confirms that the data is valid. Accordingly, the build-break functions in the source code provide a provenance check and a validity check to ensure the validity of the data, any functions based thereon, and any outcomes or products of the functions.

The act 260 of running a build tool to perform a computer program build effective to compile the source code into an executable computer program that uses the data obtained from the at least one remote location may be similar or identical to the act 160 disclosed above, in one or more aspects. For example, running a build tool to perform a computer program build effective to compile the source code into an executable computer program may include running a build tool that forces dependency checking. The build tool may include Apache Ant, Apache Maven, Gradle, MSBuild, sbt, Waf, or the like.

The build tool may compile the source code into an executable computer program or further compilable or transformable format. The build tool checks validity of the data in the code via dependency checking (e.g., running the checksum queries) during the build. The executable computer program may be output in a verified archive format with the data incorporated therein as one or more verified libraries. The verified archive format may be a signed Java Archive ("JAR") file in zip format, tar format, or the like. For example, executable computer program may be output in a JAR file with the data incorporated therein as one or more archives.

The checksum query, the at least one validation function, and the build-break function provide instructions for checking dependencies and continuing or stopping a build based on the currentness and validation of the data in the one or more functions. The build tool completes the build of the executable computer program containing the one or more functions only if the checksum query determines that the source identifier status code matches the current source identifier status code of the remote location and the data is valid according to the at least one validation function.

The act 270 of running a transformation function on the executable computer program in a second build tool to transform the executable computer program from a first format to a second format, wherein the second build tool executes the at least one validation function and build break function on the data that has been transformed to ensure the data that has been transformed is valid may include executing a second build tool on the executable computer program or artifacts therein. The second build tool may be similar or identical to the first build tool in one or more aspects. The act 270 of running a transformation function on the executable computer program in a second build tool may be similar or identical to the act of performing transformations with transformation functions disclosed above with respect to the method 100, in one or more aspects. In examples, running a transformation function on the executable computer program in a second build tool, includes writing a transformation function, such as creating a transformation project in an SCM associated with a second (subsequent) build tool.

The second build tool may include executable instructions to perform the transformation functions and build a new (e.g., transformed) executable computer program with the transformed data, one or more functions, validation functions, checksum query, etc. For example, the second build tool may execute the transformation functions effective to transform the executable computer program (e.g., entire JAR file or portions thereof) from a first format to a second format. The second build tool may execute the transformation functions effective to transform the data from the first format (e.g., programming language, unit of measure, or presentation arrangement) to the second format. The second build tool may execute the transformation functions effective to transform the one or more functions, the checksum query, the at least one validation function, the metadata, or any other portions of the executable computer program from the first format to the second format.

The second build tool executes one or more of the at least one validation function; a new validation function adapted to test the validity of the transformed data, transformed functions, etc.; the checksum query; or the transformation function as portions of the second build process. Accordingly, the validity of the transformed data is also confirmed upon running the second build process. The second build tool executes the at least one validation function associated with any dependencies in the executable computer program, such as to data that is the target of a transformation function. Accordingly, the data and transformed data are checked for validity during each build. The transformed build-break function is run to ensure that the build tool only outputs transformed executable computer programs with valid (transformed) data.

Further transformations may be carried out on the transformed executable computer program. The transformed executable computer program(s) may be used as modular building pieces of larger executable computer programs which perform the one or more functions using the transformed data in the transformed executable computer program.

The method 200 may include adding a report function to the source code that provides a report of a mismatch between the source identifier status code and the current source identifier status code, or a report that the data is found to be invalid, and identifies the data associated therewith as disclosed above with respect to the method 100.

Figure 3:
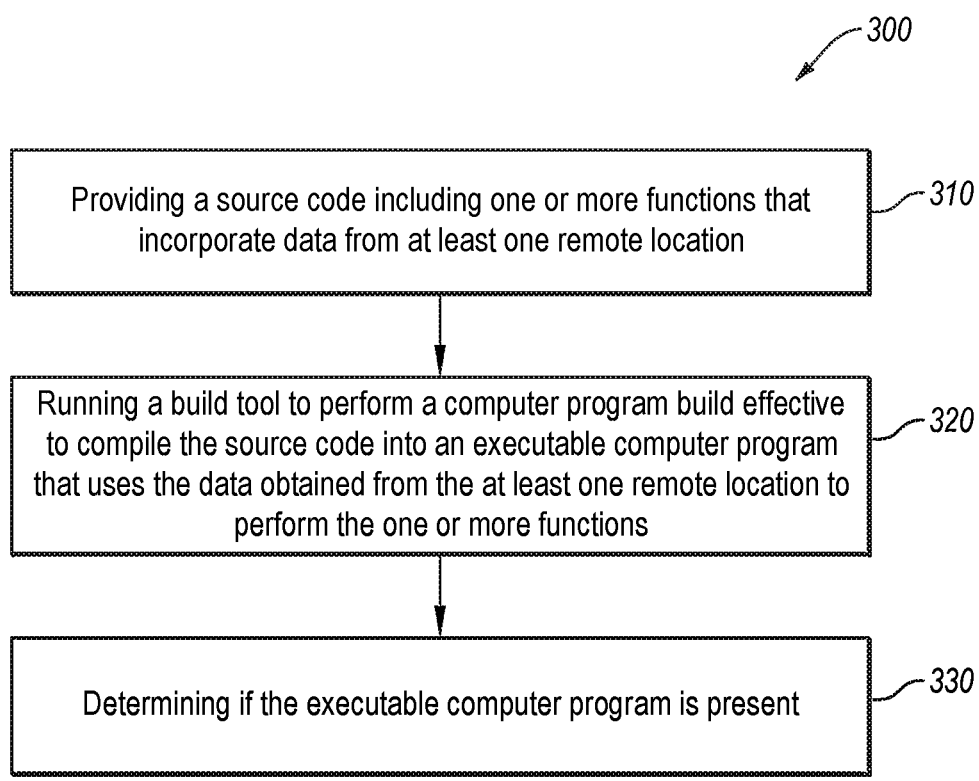
FIG. 3 is a flow chart of method of building a computer program using data incorporated therein, according to an embodiment.

FIG. 3 is a flow chart of method 300 of building a computer program using data incorporated therein, according to at least one embodiment. The method 300 includes the act 310 of providing a source code including one or more functions that incorporate data from at least one remote location. The method 300 includes the act 320 of running a build tool to perform a computer program build effective to compile the source code into an executable computer program that uses the data obtained from the at least one remote location to perform the one or more functions. The method 300 includes the act 330 of determining if the executable computer program is present.

The method 300 may include more of fewer acts than the acts 310-330. For example, the act 330 may be omitted from the method 300. Additionally, the acts of the method 300 may be carried out in a different order than presented. At least some of the acts 310-330 may be performed with or on a computer or computing device, such as one or more desktop computers, one or more laptop computers, one or more servers, one or more tablets, etc.

The method 300 includes the act 310 of providing a source code including one or more functions that incorporate data from at least one remote location. In some examples, providing a source code including one or more functions that incorporate data from at least one remote location includes providing the source code in electronic format, such as stored on a computer-readable non-transitory memory storage medium. The non-transitory memory storage medium may include a hard drive, a memory stick, a disc, or any other medium that contains the source code including the one or more functions therein. The source code may be provided in open standard format for electronic data, such as XML or any of the other open standard formats disclosed herein.

The source code and functions therein may be similar or identical to any of the source codes and one or more functions disclosed herein, in one or more aspects. For example, the source code may include XML and the one or more functions may include one or more queries of the data. The source code may be contained in a POM. The data in the source code may be accessed and obtained from the remote location, such as a database, webpage, archive, etc., containing the data.

In some examples, providing a source code including one or more functions that incorporate data from at least one remote location includes providing source code including any of the functions disclosed herein. For example, the source code may include one or more functions incorporating data obtained from at least one remote location, one or more source identifier status codes from the at least one remote location into the one or more functions, one or more checksum queries, the at least one validation function, one or more build-break functions, or one or more reporting functions. The one or more functions, the data, the at least one remote location, the one or more source identifier status codes, the one or more checksum queries, the at least one validation function, the one or more build-break functions, or the one or more reporting functions may be as disclosed herein, in one or more aspects. For example, the build-break function instructs the build tool to stop the build if the source identifier status code and the current source identifier status code do not match. Thus, the build continues the computer program build only if the source identifier status code and the current source identifier status code match in a specific function of the one or more functions and the at least one validation function confirms that the data is valid.

The act 310 of providing a source code including one or more functions that incorporate data from at least one remote location may include writing the source code to include the one or more functions, the data, the source identifier status code, the checksum query, the build-break function, the at least one validation function, the reporting function, or any other portion of the source code. For example, each of the above-noted objects may be written into a POM. The act 310 of providing a source code including one or more functions that incorporate data from at least one remote location may include providing a group of functions at least some of which include data, a source identifier status code associated with the remote location where and when the data was obtained (e.g., web page checksum or hash), the address of the remote location, in separately usable and buildable functions. The group of functions may be stored in a database, repository, archive, or library of functions on a computer-readable, non-transitory memory storage medium. Each function of the group of functions may be stored with the associated data and metadata in the source code format, such is in an individual POM. Each function of the group of functions may be in source code format such as XML format of any other open standard format. In some examples, each function of the group of functions may be modularly inserted into the source code.

The data in each function may be checked and verified as the source code is processed with a build tool to produce the executable computer program containing the function(s) and the data for performing the function(s). the executable computer program may be part of an artifact (e.g., JAR file) containing the one or more function(s), transformation functions, validation functions, checksum query, and the data for performing any of the functions disclosed herein.

The method 300 includes the act 320 of running a build tool to perform a computer program build effective to compile the source code into an executable computer program that uses the data obtained from the at least one remote location to perform the one or more functions. In some examples, running the build tool may include initiating a build with a build tool stored in a computer-readable, non-transitory memory storage medium (e.g., hard drive, processor, memory, etc.).

In some examples, running a build tool to perform a computer program build effective to compile the source code into an executable computer program that uses the data obtained from the at least one remote location to perform the one or more functions is performed on or with a computer or computer network. In some examples, running a build tool to perform a computer program build effective to compile the source code into an executable computer program includes compiling, building, or otherwise converting the source code into a computer readable and executable format or a format that is compilable to an executable computer program format. For example, running a build tool may include compiling the source code into a verified archive format with the data incorporated therein as one or more libraries. The verified archive format may include a signed JAR file or the like, as disclosed herein. During the compiling process, the data in the source code can be tested to ensure the data is valid according to the written tests (e.g., validation functions) included in the source code. During the compiling process, the data, one or more functions, at least one validation function, checksum query, source identifier status code, or any other objects in the source code (or executable computer program based thereon) may be transformed via transformation functions in or referenced by the source code. For example, the data may be transformed from a first format to a second format, or may be incorporated into a larger function which performs operations of the data to provide an output. Although the data may be transformed, the resulting transformed executable computer program will maintain some or all information relating to the original versions of the checksum query, the source identifier status code, the validations functions, the transformation functions, etc. to ensure that the outputs of the executable computer program can be reproduced if needed.

The JAR file may include computer executable instructions (e.g., code) for running the one or more functions of the executable computer program. The executable instructions in the JAR file containing the executable computer program use the data obtained from the at least one remote location and incorporated into the executable computer program to perform the one or more functions and provide an output therefrom.

In some examples, running a build tool to perform a computer program build effective to compile the source code into the executable computer program includes running a build tool that forces dependency checking, such as Apache Ant, Apache Maven, Gradle, MSBuild, sbt, Waf, or the like. The build tool is programmed to execute the checksum query to check for a match between the source identifier status code and the current source identifier status code corresponding (at the remote location) to each set of data for each function. The build tool is programmed to execute the at least one validation function to check the validity of the data and/or one or more functions which operate on the data. The build tool is programmed to execute the build-break function if the source identifier status code and the current source identifier status code do not match or if the validation function(s) determine the data is not valid.

The method 300 includes the act 330 of determining if the executable computer program is present. Determining if the executable computer program is present may be automatically performed by the build tool or a separate program or tool. The build tool or a separate program or tool may provide a visual indication or alert that the build was broken or completed. For example, the build tool may output the executable computer program in a JAR file format (or the like) to a selected location. The existence of the JAR file indicates that the executable computer program is present, and the data therein is current and verified as such. The JAR file also contains the data, any meta data associated therewith, the remote location, the source identifier status code, the checksum query, the at least one validation function, the build-break function, or previous versions of any of the foregoing, as individual artifacts within the JAR file. Determining if the executable computer program is present may be performed by a user via visual inspection of a file location. Determining if the executable computer program is present may be performed by code in the build tool or executable computer program which specifies that an alert is sent to a specific location (e.g., a file, web address, or e-mail address).

In some examples, the reporting function may alert the user or program that the executable computer program is or is not present. If there is no build, one or more functions may automatically inform the user which data is not current or valid (e.g., where the build was broken). In such examples, the reporting function may specify which data is not up-to-date or valid and the associated function which incorporates the data.

In some examples, the method 300 includes outputting the executable computer program containing the one or more functions incorporating the data. In some examples, outputting the executable computer program containing the one or more functions incorporating the data may include automatically communicating the executable computer program to an electronic file, such as a website, a database, a file folder, an electronic mail address, or the like. In such examples, the build tool may include instructions to output the executable computer program to the electronic file. The executable computer program (e.g., executable code, or entire JAR file) may be output as a computer program product for later use.

In some examples, the method 300 includes running the executable computer program (as a service) to perform the one or more functions therein. For example, the executable computer program may perform the one or more queries in the one or more functions, using the data, to provide outputs. The outputs may be answers to specific questions or feed into the answer to a larger question for which the executable computer program is built to answer. Running the executable computer program may include executing the executable computer program on a computer, computer network, or other electronic device equipped to perform the functions therein.

Figure 4:
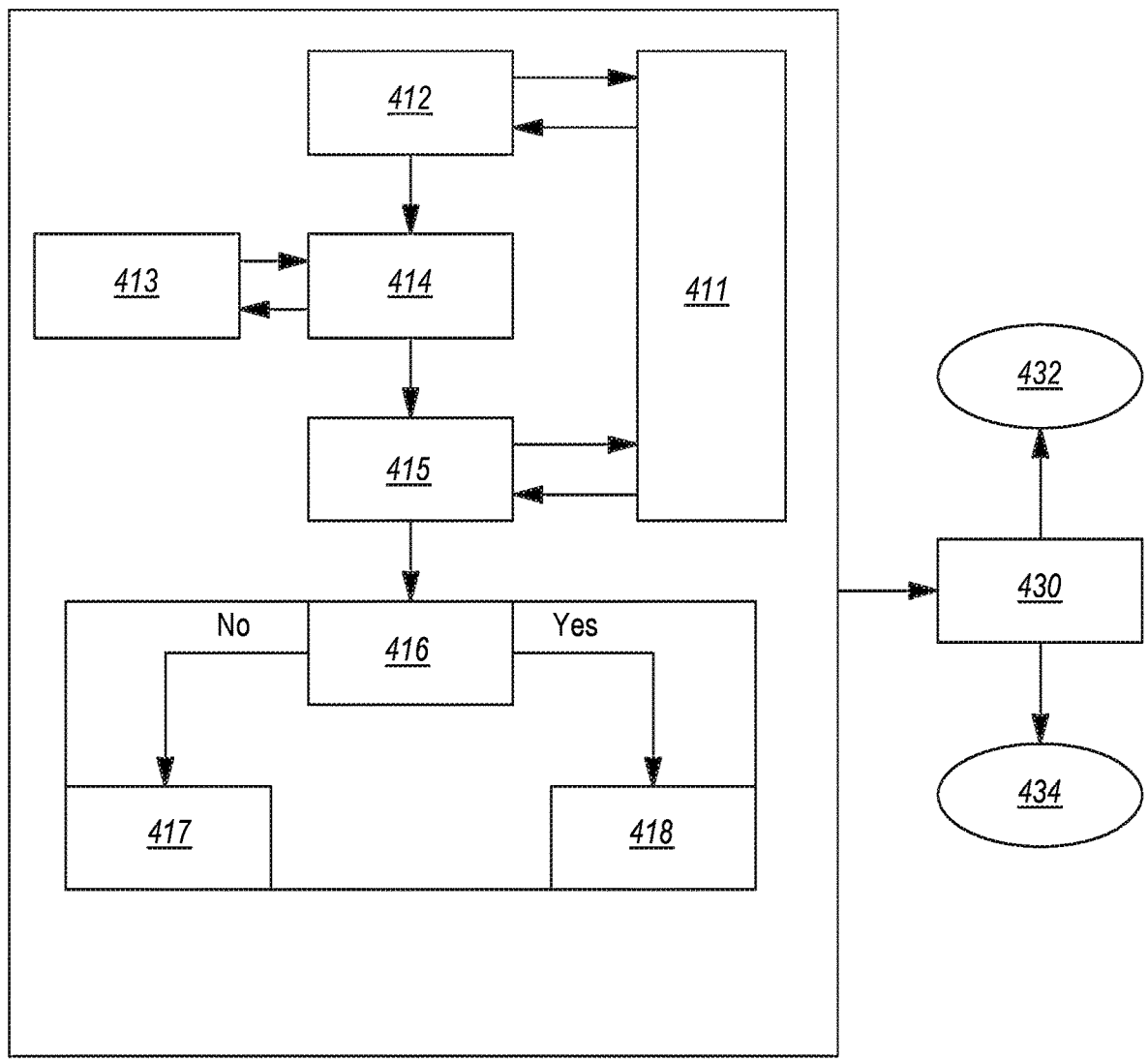
FIG. 4 is a block diagram of a process of running a build tool on source code, according to an embodiment.

FIG. 4 is a block diagram of a process 400 of running a build tool 430 on source code 410, according to an embodiment. As disclosed herein, the source code 410 may include one or more functions 412, one or more checksum queries 414, at least one validation function 415, a build-break function 416, or combinations of the foregoing. The source code 410 may include or include reference locations of the data 411 and the source identifier status code 413.

The source code 410 may be disposed on a computer-readable, non-transitory memory storage medium. For example, the source code 410 may be stored on a hard-drive, a memory stick, a processor, RAM, ROM, a disk, or any other non-transitory computer readable storage medium. The source code 410 may be in an open standard format as disclosed herein.

The data 411 may be stored in the source code 410. In some examples the data may be stored in a repository, archive, or library that is referenced by the source code 410. Accordingly, the data may be included in the source code, either directly or as a dependency. The data 411 may be accessible and usable by the other components of the source code 410.

The one or more functions 412 may each include a query, the data 411 for answering the query or a reference to the location of the data 411 in the source code. In some examples, the one or more functions 412 may include a source identifier status code 413 for the remote location where the data 411 was obtained, as disclosed herein. Accordingly, each of the one or more functions 412 may provide a complete means of asking and answering a query based on the data 411.

The source code further includes the source identifier status code 413, the checksum queries 414 and the at least one validation function 415 for collectively verifying that the data 411 is current and valid. For example, the source identifier status code 413 (e.g., checksum or hash) is compared to the current source identifier status code at the remote location to determine if the data has changed.

The one or more checksum queries 414 may include instructions to access and obtain the current source identifier status code from the remote location corresponding to the data in a specific function at an electronic address of the remote location, as stored in the source code (e.g., associated with the data). In some examples, the one or more checksum queries 414 may include the electronic address of the remote location and instructions to access and obtain the current source identifier status code from the remote location corresponding to the data in a specific function. The one or more checksum queries 414 include instructions to compare the source identifier status code 413 corresponding to the data in a specific function with the current source identifier status code at an electronic address of the remote location where the data was obtained. The checksum query 414 determines if the source identifier status code matches the current source identifier status code.

The source code 410 may include a source identifier status code 413 and checksum query 414 corresponding to each of the one or more functions or each of the one or more functions that contain data obtained from a remote location. The source code 410 may include a single checksum query 414 with instructions to check each of the source identifier status codes 413 in the functions of the source code 410 with the current source identifier status code corresponding thereto.

In some examples, the checksum query 414 may not be executed in a build for some data 411, such as when the data 411 has been previously checked via a dependency. However, the at least one validation function 415 is run each time a build is carried out.

The at least one validation function 415 may include instructions to access the data 411 and perform one or more functions thereon to determine if the data is in a selected format (e.g., XML, HTML, etc.), contained values in a selected range, contained values of a selected type (e.g., days, minutes, grams, meters, density, etc.), or produces output values in a selected range or type. The at least one validation function 415 determines if the data is valid according to a selected standard. The at least one validation function 415 may include a function which accesses the data and determines if one or more values of the data 411 satisfy a selected condition (e.g., value in a selected range, etc.) or if the format of the data 411 is in a selected format, as disclosed herein. Accordingly, the one or more functions 412 can provide an answer to the query that indicates that the data satisfies or does not satisfy a selected condition and is therefore valid or not valid.

The build-break function 416 includes instructions 417 to stop a build if the source identifier status code and the current source identifier status code corresponding to data in at least one of the one or more functions do not match or if the at least one validation function determines the data is not valid. The build-break function 416 includes instructions 418 to output an executable computer program if the source identifier status code and the current source identifier status code match and the data is verified as valid.

The build tool 430 may include any of the build tools disclosed herein, such as Apache Ant, Apache Maven, Gradle, MSBuild, sbt, Waf, or the like. The source code 410 may be built on or communicated to a computer containing the build tool 430. For example, the source code 410 or data 411 and one or more functions 412 therein may be stored as an unbuilt computer program product. The build tool 430 may be used to build the source code 410 into an executable computer program 432 incorporating verified data, such as in a verified archive format. For example, the build tool 430 may be used to build the source code 410 into a JAR file containing the data 411 therein as one or more archives or libraries. The executable computer program 432 includes the functions and verified data to answer the queries in the functions as disclosed herein. In examples, the executable computer program 432 is in a verified archive format file (e.g., JAR file) along with one or more the data 411, the one or more functions 412, the source identifier status code 413, the address of the remote location, the checksum query 414, the at least one validation function, the build-break function 416, meta data, or previous versions of any of the preceding. The components of the JAR file may be stored therein as individual components (e.g., artifacts). The build tool 430 carries out the checksum query, the one or more validation functions, transformation functions, and compiles the source code 410 into the executable computer program capable of performing the one or more functions 412 with the data 411.

The build tool 430 can break the build based on the build-break function 416. In such examples, the build tool 430 may provide an indication 434 that the build is broken. For example, the build tool 430 may output a report with text that states the build is broken as disclosed herein with respect to the reporting function. In such examples (not shown), the source code 410 may include the reporting function, as disclosed herein.

Figure 5:
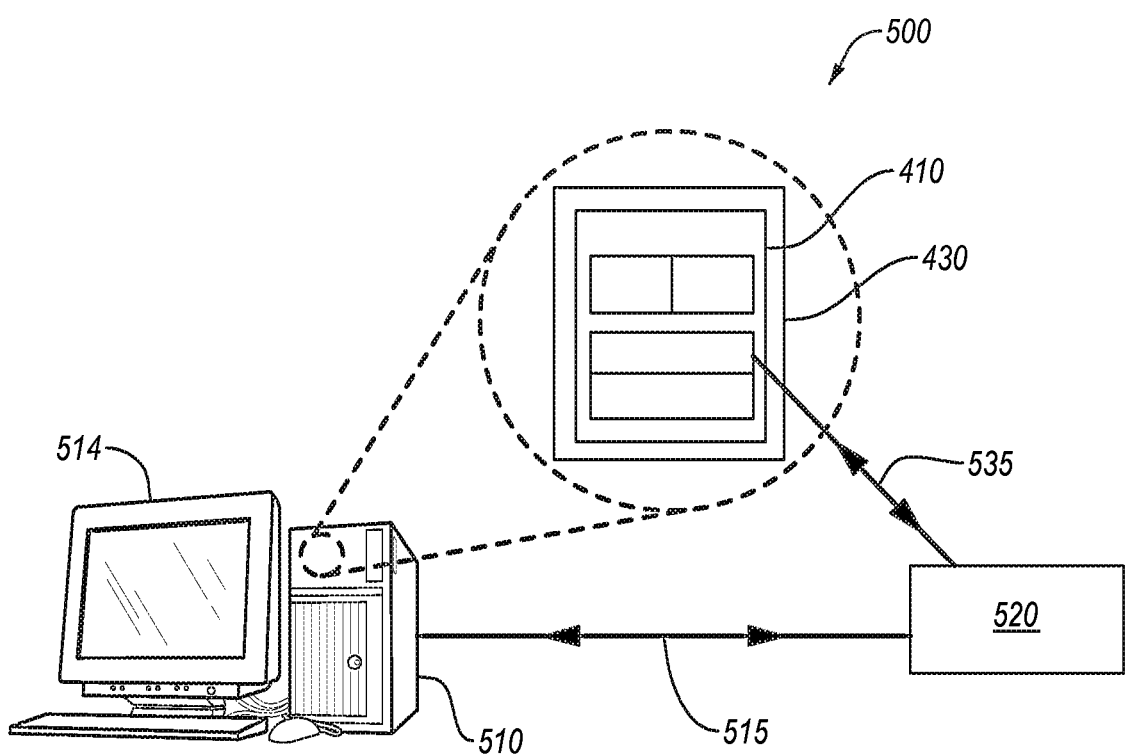
FIG. 5 is a schematic of a computer system for creating and executing a executable computer program having verified data therein, according to an embodiment.

FIG. 5 is a schematic of a computer system 500 for creating and executing a executable computer program having verified data therein, according to one or more embodiments. The computer system 500 includes the computer 510 having access to the remote location 520. The computer 510 may be similar or identical to any computer disclosed herein, such as a desktop computer, a laptop computer, a server, a network, a cloud computing device, a tablet, a smart phone, etc. For example, the computer 510 may have equipment and programming to access the remote location 520, such as via the Internet, an intranet, cloud storage, etc. The computer 510 stores the source code 410 therein. For example, the source code 410 may be stored in one or more of the memory (e.g., RAM or ROM), a processor, or other storage device (e.g., disk) in the computer 510.

The computer 510 may be used to build the source code 410 or may receive at least portions of the source code 410 from the remote location 520 (e.g., a website via an Internet connection, a database over an intranet connection, a disk, a USB drive, etc.). For example, the computer 510 is operably coupled or couplable to the remote location 520 via an Internet connection. In such examples, the computer 510 can access the webpage containing a repository for a selected type of data and download 515 said data along with the corresponding source identifier status code from the webpage. The remote location 520 may be stored on, and provided from, a second computing device such as a server, computer, etc.

The computer 510 may store the address of the remote location 520, the data, and the corresponding source identifier status code, within the source code 410. The source code 410 includes the checksum queries and the build-break function as disclosed herein.

The computer 510 may store the build tool 430 therein. The build tool 430 may be as described herein. Upon execution, the build tool 430 may compile, link, and package the source code into a computer executable program. Upon execution, the build tool 430 may check dependencies of the data in the respective artifacts in which the data is stored. For example, the build tool 430 may execute 535 the checksum query to determine if the source identifier status code stored associated with the data matches the current source identifier status code at the remote location. Upon execution, the build tool 430 may test the validity of the data in the compiled format. For example, the build tool 430 may execute the at least one validation function to determine the validity of the data. The build tool 430 executes the build-break function to stop the build if the source identifier status code for a set of the data does not match the current source identifier status code or the at least one validation function determines the data is not valid. Accordingly, the product of the build tool 430 (e.g., executable computer program) includes only valid and up-to-date data. The source code 410 or the executable computer program 432 may be used as a computer program product or a portion thereof.

As noted above, the computer 510 may include a user interface 514 such as one or more of a keyboard, a screen, a touchscreen, a mouse, etc. The source code 410 may be built or selected using the user interface 514. The build tool 430 may be selected and executed using the user interface 514. The source code and the executable computer program may be viewed on the user interface 514. The build tool 430 may output a visual indication that the build was stopped (e.g., the source identifier status code and the current source identifier status code). The build tool 430 may indicate the data, the remote location corresponding to the data, and the point in the source code where the same are located, that have a corresponding mismatch between the source identifier status code and the current source identifier status code. The build tool 430 may indicate the data, the remote location corresponding to the data, and the point in the source code where the same are located, are determined to be invalid according to the at least one validation function.

The build tool 430 may output a visual indication that the build is completed, such as the executable computer program. For example, the build tool 430 may output the executable computer program to the computer 510 for displaying on the user interface 514.

Figure 6:
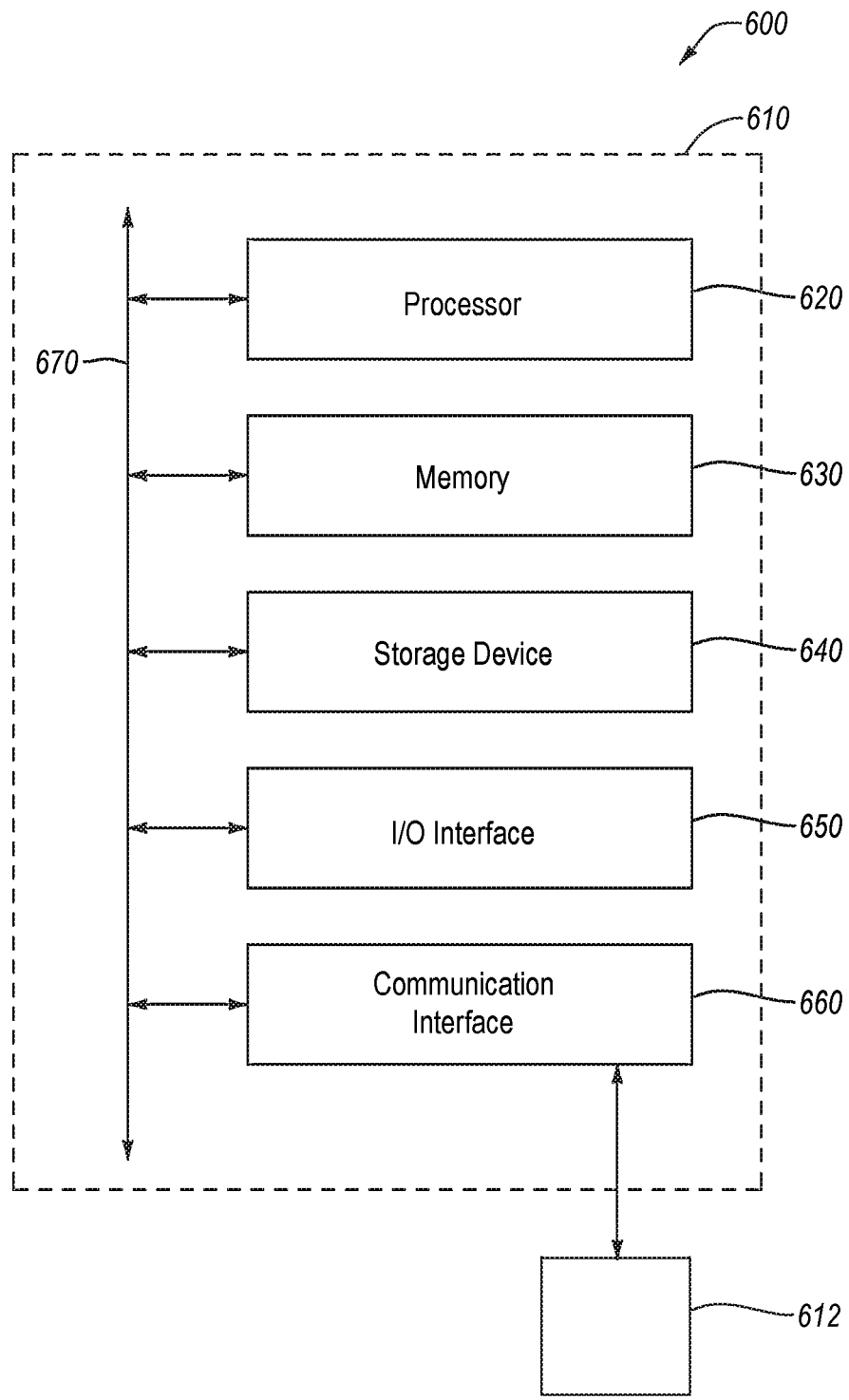
FIG. 6 is a schematic of a system for executing any of the methods disclosed herein, according to an embodiment.

FIG. 6 is a schematic of a system 600 for executing any of the methods disclosed herein, according to an embodiment. The system 600 may be configured to implement any of the methods disclosed herein, such as the method 100, 200, or 300. The system 600 includes at least one computing device 610. In some embodiments, the system 600 may include one or more additional computing devices 612, such as operably coupled thereto over a network connection. The at least one computing device 610 is an exemplary computing device that may be configured to perform one or more of the acts described above, such as the method 100, 200, or 300. The at least one computing device 610 can include one or more servers, one or more computers (e.g., desk-top computer, lap-top computer), one or more mobile computing devices (e.g., smartphone, tablet, etc.). The computing device 610 can comprise at least one processor 620, memory 630, a storage device 640, an input/output ("I/O") interface 650, and a communication interface 660. While an example computing device 610 is shown in FIG. 6, the components illustrated in FIG. 6 are not intended to be limiting of the system 600 or computing device 610. Additional or alternative components may be used in some embodiments. Further, in some embodiments, the system 600 or the computing device 610 can include fewer components than those shown in FIG. 6. For example, the system 600 may not include the one or more additional computing devices 612. In some embodiments, the at least one computing device 610 may include a plurality of computing devices, such as a server farm, computational network, or cluster of computing devices. Components of computing device 610 shown in FIG. 6 are described in additional detail below.

In some embodiments, the processor(s) 620 includes hardware for executing instructions (e.g., running the functions in the source code, or executing the build tool), such as those making up a computer program. For example, to execute instructions, the processor(s) 620 may retrieve (or fetch) the instructions from an internal register, an internal cache, the memory 630, or a storage device 640 and decode and execute them. In particular embodiments, processor(s) 620 may include one or more internal caches for data, source identifier status codes, remote location addresses, functions, etc. As an example, the processor(s) 620 may include one or more instruction caches, one or more data caches, and one or more translation lookaside buffers (TLBs). Instructions in the instruction caches may be copies of instructions in memory 630 or storage 640. In some embodiments, the processor 620 may be configured (e.g., include programming stored thereon or executed thereby) to carry out one or more portions of any of the methods disclosed herein.

In some embodiments, the processor 620 is configured to perform any of the acts disclosed herein such as in method 100, 200, or 300 or cause one or more portions of the computing device 610 or system 600 to perform at least one of the acts disclosed herein. Such configuration can include one or more operational programs (e.g., computer program products) that are executable by the at least one processor 620. For example, the processor 620 may be configured to automatically build the source code with the build tool to provide verification of outputs (and data validity) of a computer program product. The verification is provided via the mere existence of the executable computer program as discussed above. The at least one processor 620 may be configured to output the executable computer program to the user interface or an additional computing device.

The at least one computing device 610 may include at least one non-transitory memory storage medium (e.g., memory 630 and/or storage 640). The computing device 610 may include memory 630, which is operably coupled to the processor(s) 620. The memory 630 may be used for storing build tools, source code, data, metadata, and computer programs, and executable computer programs for execution by the processor(s) 620. The memory 630 may include one or more of volatile and non-volatile memories, such as Random Access Memory (RAM), Read Only Memory (ROM), a solid state disk (SSD), Flash, Phase Change Memory (PCM), or other types of data storage. The memory 630 may be internal or distributed memory.

The computing device 610 may include the storage device 640 having storage for storing data, source code, build tools, instructions, etc. The storage device 640 may be operably coupled to the at least one processor 620. In some embodiments, the storage device 640 can comprise a non-transitory memory storage medium, such as any of those described above. The storage device 640 (e.g., non-transitory memory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 640 may include removable or non-removable (or fixed) media. Storage device 640 may be internal or external to the computing device 610. In some embodiments, storage device 640 may include non-volatile, solid-state memory. In some embodiments, storage device 640 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

In some embodiments, one or more of source code, build tools, data, remote location addresses, computer programs, executable computer programs, etc., may be stored in a memory storage medium such as one or more of the at least one processor 620 (e.g., internal cache of the processor), memory 630, or the storage device 640. In some embodiments, the at least one processor 620 may be configured to access (e.g., via bus 670) the memory storage medium(s) such as one or more of the memory 630 or the storage device 640. For example, the at least one processor 620 may receive and store the data (e.g., look-up tables, form data, NCCI codes, law, etc.) as a plurality of data points in the memory storage medium(s). The at least one processor 620 may execute the build tool to build the source code into an executable computer program using the one or more functions, data, remote location address, source identifier status code, current source identifier status code, one or more checksum queries, validation functions, build-break functions, etc., therein. For example, the at least one processor 620 may access the source code or portions thereof (e.g., individual functions) in the memory storage medium(s) such as memory 630 or storage device 640.

The computing device 610 also includes one or more I/O devices/interfaces 650, which are provided to allow a user to provide input to, receive output from, and otherwise transfer data to and from the computing device 610. These I/O devices/interfaces 650 may include a mouse, keypad or a keyboard, touch screen, screen, camera, optical scanner, network interface, web-based access, modem, a port, other known I/O devices or a combination of such I/O devices/interfaces 650. The touch screen may be activated with a stylus or a finger.

The I/O devices/interfaces 650 may include one or more devices for presenting output to a user, including, but not limited to, a graphics engine, a display (e.g., a display screen or monitor), one or more output drivers (e.g., display drivers), one or more audio speakers, and one or more audio drivers. In certain embodiments, devices/interfaces 650 are configured to provide graphical data (e.g., a portal and/or textual explanations) to a display (e.g., home or office computer screen) for presentation to a user. The graphical data may be representative of one or more graphical user interfaces and/or any other graphical content as may serve a particular implementation.

The computing device 610 can further include a communication interface 660. The communication interface 660 can include hardware, software, or both. The communication interface 660 can provide one or more interfaces for communication (such as, for example, packet-based communication) between the computing device 610 and one or more additional computing devices 612 or one or more networks. For example, communication interface 660 may include a network interface controller (NIC) or network adapter for communicating with an Ethernet or other wire-based network or a wireless NIC (WNIC) or wireless adapter for communicating with a wireless network, such as a WI-FI.

Any suitable network and any suitable communication interface 660 may be used. For example, computing device 610 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of system 600 or computing device 610 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 610 may include any suitable communication interface 660 for any of these networks, where appropriate.

In some embodiments, the computing device 610 may include a computer or server having a network connection, and the computer or server includes programming therein adapted to output the source codes (or portions thereof), the computer program, the executable computer program, the remote location address, etc.

The computing device 610 may include a bus 670. The bus 670 can include hardware, software, or both that couples components of computing device 610 to each other. For example, bus 670 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the acts described herein, such as in the method 100, 200, or 300 may be performed by and/or at the computing device 610. Additionally or alternatively, one or more of the acts described herein may be performed by or at another computing device such as additional computing device 612. For example, some of the acts may be performed by or on a personal computing device of the user (e.g., additional computing device 612), such as a personal computer, smart phone, etc., (e.g., receiving electronic messages), while one or more of the acts may be performed by another computing device (e.g., computing device 610), such as a server, that may be operably connected to the personal computing device of the user. Accordingly, one or more elements of system 600 can be remotely distributed from one another and/or one or more elements of the system 600 can be collocated. For example, inputting the data or source code may be performed via the additional computing device 612, such as by a computer program author manually providing the data (and associated source identifier status code) or portions of the source code into the computing device 610 via a network connection, or, by automatically transferring the same via a data transfer routine, order, dump, or other mechanism. In some embodiments, the data, source code (e.g., portions thereof), or the executable computer program may be displayed on the additional computing device 612, such as via a web or network connection either directly or indirectly from the additional computing device 612 to the computing device 610.

Referring back to FIG. 4, a computer program product may include one or more of the source code 410, the executable computer program 432, or portions thereof. In some examples, the one or more functions, checksum queries (e.g., functions), build-break functions, validation functions, etc. in the source code may be available as individual building blocks for assembling a computer program (e.g., in source code). In some examples, the one or more functions, checksum queries (e.g., functions), build-break functions, validation functions, etc. in the executable computer program may be available as individual building blocks for assembling a larger executable computer program.

Figure 7:
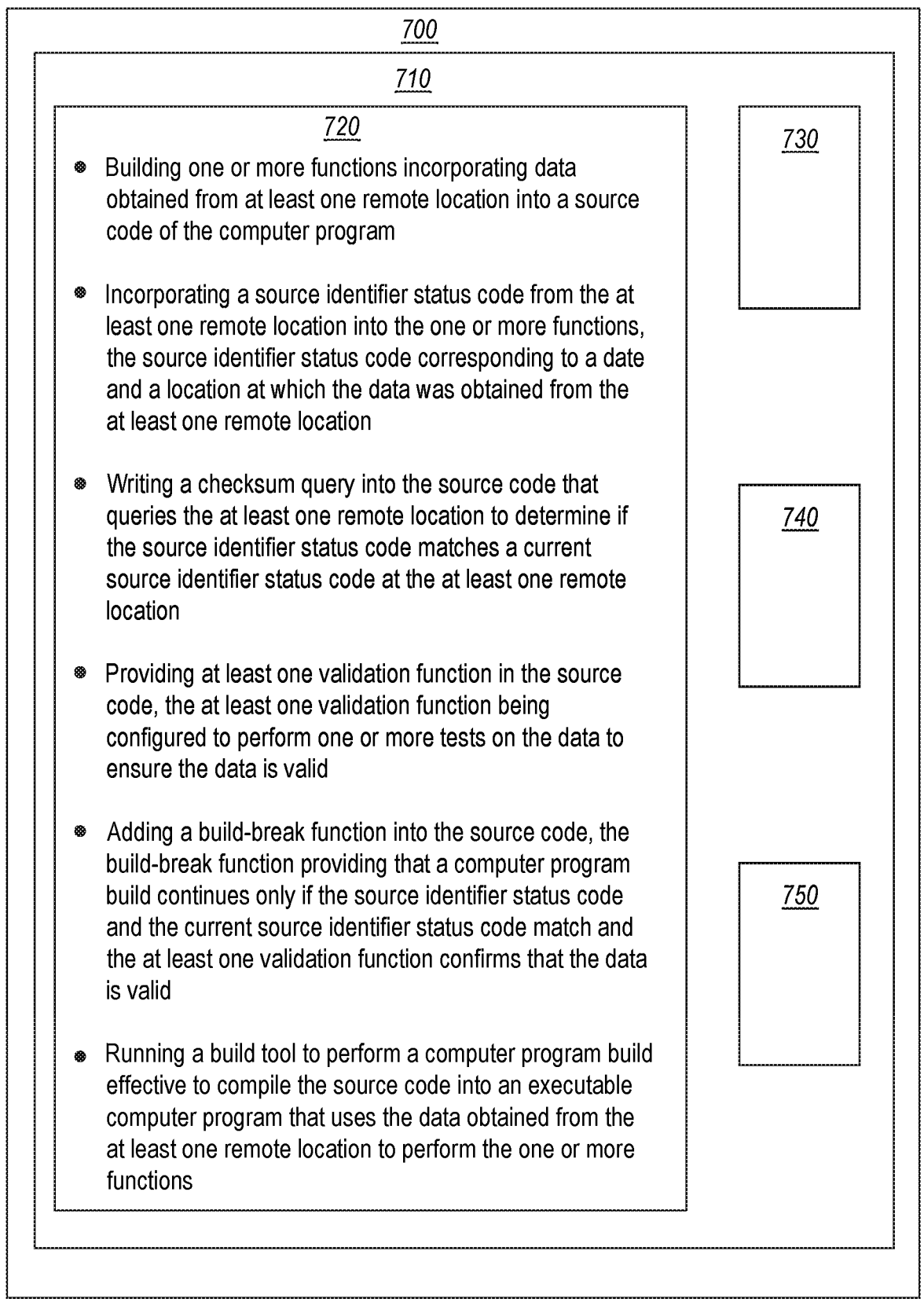
FIG. 7 is a block diagram of an example computer program product, according to an embodiment.

FIG. 7 is a block diagram of an example computer program product 700, according to an embodiment. The computer program product 700 is arranged to store instructions for a method of validating data incorporated into a computer program as disclosed herein. The non-transitory signal bearing medium 710 may include a computer-readable medium 730 (e.g., read-only memory, RAM, hard drive such as a magnetic disc drive or solid state disc, flash memory stick, internal cache of a processor, or optical disc), a computer recordable medium 740 (e.g., RAM, hard drive, memory stick, optical disc, etc.), a computer communications medium 750 (e.g., internal cache of a BUS, etc.), or combinations thereof, stores programming instructions 720 (e.g., computer code) that may configure the processing unit of an associated computer storing the same to perform all or some of the methods or acts described herein. The instructions may include, for example, one or more machine-readable and executable instructions for "building one or more functions incorporating data obtained from at least one remote location into a source code of the computer program." These instructions may include, for example, one or more machine-readable and executable instructions for "incorporating a source identifier status code from the at least one remote location into the one or more functions, the source identifier status code corresponding to a date and a location at which the data was obtained from the at least one remote location." The instructions may include, for example, one or more machine-readable and executable instructions for "writing a checksum query into the source code that queries the at least one remote location to determine if the source identifier status code matches a current source identifier status code at the at least one remote location." The instructions may include, for example, one or more machine-readable and executable instructions for "providing at least one validation function in the source code, the at least one validation function being configured to perform one or more tests on the data to ensure the data is valid." The instructions may include, for example, one or more machine-readable and executable instructions for "adding a build-break function into the source code, the build-break function providing that a computer program build continues only if the source identifier status code and the current source identifier status code match and the at least one validation function confirms that the data is valid." The instructions may include, for example, one or more machine-readable and executable instructions for "running a build tool to perform a computer program build effective to compile the source code into an executable computer program that uses the data obtained from the at least one remote location to perform the one or more functions." The instructions may include a build tool or location thereof and instructions to run the build tool on the source code effective to execute the checksum query and the at least one validation function and compile source code into the executable computer program.

In some embodiments, the instructions may include any portions of the methods 100, 200, or 300 disclosed herein, in any combination. For example, the instructions may include one or more transformation functions as disclosed herein.

In some examples, the computer program product 700 may include source code (e.g., programming instructions 720) or an executable computer program comprising one or more functions incorporating data obtained from at least one remote location. The source code or executable computer program may include a source identifier status code from the at least one remote location in the one or more functions, the source identifier status code corresponding to a date and a location at which the data was obtained from the at least one remote location. The source code or executable computer program may include a checksum query that queries the at least one remote location to determine if the source identifier status code matches a current source identifier status code at the at least one remote location. The source code or executable computer program may include the at least one validation function that queries the data to determine if the data is valid according to selected criteria. The source code or executable computer program may include a build-break function providing that a computer program build continues only if the source identifier status code and the current source identifier status code match. The source code or executable computer program may be in an open standard format for electronic data, such as XML or any of the open standard formats disclosed herein.

In some examples, the computer program product 700 may include the executable computer program, such as in any of the verified archive formats disclosed herein (e.g., with the data incorporated therein as one or more verified libraries, tables, etc.). For example, the computer program product 700 may be the computer executable code (e.g., executable computer program) built from the source code via the build tool. A specific example, may include a JAR file with the data incorporated therein as one or more verified libraries. In some examples, executable code, the data, the one or more functions, the checksum queries, the at least one validation function, and the build-break functions may be present as in the output of the build tool (e.g., executable computer program.

In some examples, the computer program product may only be the computer executable code of the one or more functions with the associated data for performing the functions. In such examples, the checksum queries, the at least one validation function, and the build-break functions may not be present as an executable output of the build tool, as they have served their respective purposes during the build. Accordingly, the output executable computer programs may provide compact, reliable means of performing functions without the excess code of the verification functions (e.g., checksum queries, validation function(s), and build-break functions).

The methods, computer program products, and systems disclosed herein provide a number of improvements to current systems and methods for building and verifying computer programs that reference data obtained from a remote location. The methods, computer program products, and systems disclosed herein enable fast, automatic verification of data and the results of functions which use the data to determine an outcome. For example, the methods, computer program products, and systems disclosed herein provide verification of the status of the data (e.g., whether it is current or not) at build time. Thus, the user will know the data is current and valid, and the functions based thereon will provide valid outputs, by the mere existence of the executable computer code that was the result of a successful build process. By including the data directly in the source code and executable computer program, the executable computer program may require less compute power and provide faster processing times than programs which utilize data stored at remote locations. The methods, computer program products, and systems disclosed herein enable packaging data in a way that it can be treated as though it were just another software component. Accordingly, a single process (e.g., build) can be used to verify the validity of the data and the one or more functions (e.g., software). Also, a single build tool may be used to treat both the software (e.g., one or more functions) and the data. This enables users to treat both data and software using one, consistent technique to make sure that the data is both current according to the tests (e.g., checksum query) and the data and software is valid according to its tests (e.g., validation function(s)). Thus, duplication of efforts or build tools is eliminated thereby lowering processing use and increasing processing speeds. Accordingly, the methods, systems, and computer program products disclosed herein may eliminate the need for double-checking the data itself. Further, the methods, computer program products, and systems provide instant notification that out of date data needs to be replaced with up to date data.

The methods, computer program products, and systems disclosed herein may provide dependably repeatable, faster generation and verification of executable computer programs that incorporate data to perform functions therein, than current methods and systems. The one or more functions and the data associated therewith can be used as modules in computer programs (e.g., plurality of functions, checksum queries, build-break functions, etc.) to provide fast modular construction of computer programs in source code formats. Upon running a build tool, the data is verified as up to date, verified as valid, and built (e.g., compiled) into a computer readable and executable format, or at least a format that is compilable thereto. This provides increased accuracy over current methods and systems.

While various aspects and embodiments have been disclosed herein, other aspects and embodiments are contemplated. The various aspects and embodiments disclosed herein are for purposes of illustration and are not intended to be limiting.

What is claimed is:

1. A method of validating data incorporated into a computer program, the method comprising:
   building one or more functions incorporating data obtained from at least one remote location into a source code of the computer program;
   incorporating a source identifier status code from the at least one remote location into the one or more functions, the source identifier status code corresponding to a date or a location at which the data was obtained from the at least one remote location;
   writing a query into the source code that queries the at least one remote location to determine if the source identifier status code matches a current source identifier status code at the at least one remote location;
   providing at least one validation function in the source code, the at least one validation function configured to perform one or more tests on the data to assess whether the data is valid;
   adding a build-break function into the source code, the build-break function allowing a computer program build to continue only upon determinations that the source identifier status code and the current source identifier status code match and the at least one validation function confirms that the data is valid; and
   compiling the source code into an executable computer program that uses the data obtained from the at least one remote location to perform the one or more functions.

2. The method of claim 1, wherein building one or more functions incorporating data obtained from at least one remote location into the source code of the computer program includes archiving the data in the computer program.

3. The method of claim 1, wherein the source code is in an open standard format for electronic data.

4. The method of claim 1, wherein the executable computer program is output in a verified archive format with the data incorporated therein as one or more verified libraries.

5. The method of claim 1, wherein the query includes a checksum query that examines a correspondence between source identifier status code and the current source identifier status code at a uniform resource locator of the at least one remote location corresponding to the source identifier status code.

6. The method of claim 5, wherein the source identifier status code includes a checksum or hash and the current source identifier status code includes a current checksum or a current hash.

7. The method of claim 6, wherein the one or more functions includes a report function that provides a report of any mismatch between the source identifier status code and the current source identifier status code and identifies the data associated therewith.

8. The method of claim 1, wherein the at least one validation function in the source code is configured to test the data to confirm that the data is in a format specified by the source code.

9. The method of claim 1, wherein the at least one validation function in the source code is configured to test the data to confirm that the data contains values that satisfy one or more criteria of the at least one validation test.

10. The method of claim 1, wherein incorporating a source identifier status code from the at least one remote location into the one or more functions includes incorporating a checksum or a hash from a uniform resource identifier corresponding to the at least one remote location into the one or more functions.

11. The method of claim 1, further comprising running a transformation function on the executable computer program to transform the executable computer program from a first format to a second format.

12. The method of claim 1, wherein compiling the source code includes running a build tool to compile the source code into an executable computer program includes running Apache Ant, Apache Maven, Gradle, MSBuild, sbt, or Waf.

13. A computer program product embodied on a non-transitory computer readable media, comprising:
a source code, including:
one or more functions incorporating data obtained from at least one remote location;
a source identifier status code from the at least one remote location in the one or more functions, the source identifier status code corresponding to a date or a location at which the data was obtained from the at least one remote location;
a query in the source code that queries the at least one remote location to determine whether the source identifier status code matches a current source identifier status code at the at least one remote location;
at least one validation function configured to perform one or more tests on the data to assess whether the data is valid;
a build-break function configured to allow a computer program build to continue only upon determinations that the source identifier status code and the current source identifier status code match and the at least one validation function confirms the data is valid.

14. The computer program product of claim 13, wherein the source code is in an open standard format for electronic data.

15. The computer program product of claim 14, wherein the open standard format includes xml format.

16. The computer program product of claim 13, wherein the query includes a checksum query examines a correspondence between the source identifier status code and the current source identifier status code at a uniform resource locator of the at least one remote location corresponding to the source identifier status code.

17. The computer program product of claim 13, wherein the source identifier status code includes a checksum or hash and the current source identifier status code includes a current checksum or a current hash.

\* \* \* \* \*